United States Patent
Huang et al.

(10) Patent No.: US 12,381,678 B2
(45) Date of Patent: Aug. 5, 2025

(54) UPLINK TRANSMISSION METHOD AND APPARATUS

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN); Xin Su, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/539,274

(22) Filed: Dec. 14, 2023

(65) Prior Publication Data

US 2024/0121048 A1    Apr. 11, 2024

Related U.S. Application Data

(63) Continuation of application No. 17/268,603, filed as application No. PCT/CN2019/101229 on Aug. 17, 2019, now Pat. No. 11,876,741.

(30) Foreign Application Priority Data

Aug. 17, 2018   (CN) .......................... 201810942890.6

(51) Int. Cl.
*H04L 5/00* (2006.01)
*H04W 72/1268* (2023.01)
*H04W 72/23* (2023.01)

(52) U.S. Cl.
CPC ....... *H04L 5/0048* (2013.01); *H04W 72/1268* (2013.01); *H04W 72/23* (2023.01)

(58) Field of Classification Search
CPC .. H04L 5/0048; H04W 72/23; H04W 72/1268
USPC ........................................................ 370/329
See application file for complete search history.

(56) References Cited

PUBLICATIONS

R1-1718426 (Year: 2017).*
Huawei et al., "Codebook based transmission for UL MIMO", 3GPP TSG RAN WG1 NR Ad Hoc#3, Nagoya, Japan, Sep. 18-21, 2017, total 10 pages, R1-1715584.
(Continued)

*Primary Examiner* — Intekhaab A Siddiquee
(74) *Attorney, Agent, or Firm* — KILPATRICK TOWNSEND & STOCKTON LLP

(57) ABSTRACT

The present application can provide an uplink transmission method and apparatus. The method comprises: a base station instructs a UE to send SRSs corresponding to N groups of SRS resources, each of the N groups of SRS resources comprising one or more SRS resources; N being a positive integer; the base station receives the SRSs sent by the UE to determine X groups of uplink scheduling information, each of the X groups of uplink scheduling information corresponding to one group of SRS resources in the N groups of SRS resources; uplink scheduling information in different groups corresponding to SRS resources in different groups; X being a positive integer greater than one and not greater than N; the base station sends the determined X groups of uplink scheduling information to the UE so that the UE transmits an uplink signal according to the X groups of uplink scheduling information.

18 Claims, 7 Drawing Sheets

(56) References Cited

PUBLICATIONS

Huawei et al.,"Discussion on UL multi-panel/TRP operation", 3GPP TSG RAN WG1 Meeting NR Ad Hoc #3, Nagoya, Japan Sep. 18-21, 2017, total 6 pages, R1-1715719.

CATT,"Consideration on beam management", 3GPP TSG RAN WG1 Meeting 90bis, Prague, CZ, Oct. 9-13, 2017, total 10 pages, R1-1717812.

* cited by examiner

UPLINK TRANSMISSION METHOD AND APPARATUS

The present application is a continuation application of U.S. patent application Ser. No. 17/268,603. The U.S. patent application Ser. No. 17/268,603 is a national phase entry under 35 U.S.C. § 371 of International Application No. PCT/CN2019/101229, filed on Aug. 17, 2019, which claims the priority from Chinese Patent Application No. 201810942890.6, filed on Aug. 17, 2018, in the China National Intellectual Property Administration and entitled "Uplink Transmission Method and Apparatus", the contents of which are hereby incorporated by reference in their entireties.

FIELD

The present disclosure relates to the field of mobile communication technology, and in particular to an uplink transmission method and apparatus.

BACKGROUND

In the prior art, for a Physical Uplink Shared Channel (PUSCH) transmission, a base station may send a group of uplink scheduling information for a User Equipment (UE), where the group of uplink scheduling information may include the Transmit Precoding Matrix Indicator (TPMI) and transmit layer indicator (e.g., Transmit Rank Indicator (TRI) indicating the number of transmit streams), uplink Sounding Reference Signal (SRS) indicator, etc., and the TPMI, transmit layer indicator, and SRS resource indicator, etc. in the group of uplink scheduling information are used only to indicate the information corresponding to one SRS resource set corresponding to the PUSCH, where one SRS resource set is a group of SRS resources and may include one or more SRS resources. This approach limits the flexibility of uplink scheduling.

For example, the UE may have a plurality of antenna panels for uplink transmission at present. Each antenna panel is composed of a group of antenna devices, and may include one or more antenna devices. The UE can send one data layer from one antenna panel at a time, and the UE can also send one data layer from a plurality of antenna panels at the same time. In the prior art, the UE can use a plurality of antenna panels to perform the data transmission simultaneously during uplink transmission, but the base station cannot indicate the uplink scheduling information (such as precoding matrix, sending amplitude, etc.) independently for each antenna panel of the UE, which limits the performance of the uplink transmission of the UE.

SUMMARY

The embodiments of the present disclosure provide an uplink transmission method and apparatus, to solve the problem of poor flexibility of the uplink scheduling in the prior art.

In a first aspect, an embodiment of the present disclosure provides an uplink transmission method, including:
  instructing, by a base station, a User Equipment (UE) to send Sounding Reference Signals (SRSs) corresponding to N groups of SRS resources, where each group of SRS resources comprises one or more SRS resources, and N is a positive integer greater than 1;
  receiving, by the base station, the SRSs sent by the UE;
  determining, by the base station, X groups of uplink scheduling information; where each group of uplink scheduling information corresponds to one of the N groups of SRS resources, different groups of uplink scheduling information correspond to different groups of SRS resources in the N groups of SRS resources, and X is a positive integer greater than 1 and less than N, or X is a positive integer greater than 1 and equal to N; and
  sending, by the base station, the X groups of uplink scheduling information to the UE for the UE performing uplink signal transmission according to the X groups of uplink scheduling information.

In this embodiment, the base station instructs the UE to send the SRSs corresponding to N groups of SRS resources, then determines X groups of uplink scheduling information based on the received SRSs sent by the UE, and sends the determined X groups of uplink scheduling information to the UE, where each group of uplink scheduling information corresponds to one group of SRS resources, and different groups of uplink scheduling information correspond to different groups of SRS resources, so that the UE can perform, according to each group of uplink scheduling information, the uplink signal transmission by using the uplink transmission characteristics when sending the SRS corresponding to this group of uplink scheduling information after receiving the X groups of uplink scheduling information, improving the flexibility of uplink scheduling.

In one embodiment, one of the X groups of uplink scheduling information corresponds to one antenna panel of the UE.

In this embodiment, one group of uplink scheduling information corresponds to one antenna panel of the UE, and the effect that the base station indicates the uplink scheduling information independently for each antenna panel of the UE is implemented by indicating the uplink scheduling information separately to each group of SRS resources, increasing the flexibility of uplink scheduling and improving the performance of uplink transmission of the UE.

In one embodiment, the SRSs are sent by the UE using a plurality of antenna panels, where the SRSs are sent by the UE, using different groups of antenna panels, on different groups of SRS resources.

In this embodiment, the UE uses different antenna panels to send the SRSs on different groups of SRS resources, while the base station determines the uplink scheduling information corresponding to each group of SRS resources respectively according to the received SRS on this group of SRS resources, where the determined different groups of uplink scheduling information correspond to different groups of SRS resources, and then the effect of indicating the uplink scheduling information independently for the antenna panel corresponding to each group of SRS resources is implemented by indicating the uplink scheduling information separately to each group of SRS resources, increasing the flexibility of uplink scheduling and improving the performance of uplink transmission of the UE.

In one embodiment, after the base station instructs the UE to send the SRSs corresponding to the N groups of SRS resources, the method further includes:
  sending, by the base station, correspondence information between the X groups of uplink scheduling information and the N groups of SRS resources to the UE.

In this embodiment, the base station sends the correspondence information between the X groups of uplink scheduling information and the N groups of SRS resources to the UE, so that the UE can transmit uplink signals based on the correspondence, increasing the flexibility of uplink scheduling and improving the performance of uplink transmission of the UE.

In one embodiment, the X groups of uplink scheduling information are contained in the DCI or RRC signaling.

This embodiment saves the signaling overhead of the communication system and improves the user experience.

In one embodiment, a signaling carrying the uplink scheduling information does not contain an SRS Resource Indicator (SRI) indicating an SRS resource corresponding to uplink scheduling information.

This embodiment increases the flexibility of uplink scheduling and improves the user experience.

In one embodiment, at least one of the X groups of uplink scheduling information contains indication information indicating that the at least one group of uplink scheduling information is not used for the uplink signal transmission.

This embodiment increases the flexibility of uplink scheduling and improves the user experience.

In one embodiment, before the base station determines the X groups of uplink scheduling information, the method further includes:
  agreeing on, by the base station, the value of X with the UE.

This embodiment increases the flexibility and reliability of uplink scheduling and improves the user experience.

In one embodiment, after the base station receives the SRSs sent by the UE, the method further includes:
  sending, by the base station, SRS resource set indication information to the UE, where the SRS resource set indication information indicates SRS resource sets corresponding to the X groups of uplink scheduling information.

In this embodiment, the base station indicates the resource set for uplink transmission to the UE by sending the SRS resource set indication information to the UE, increasing the flexibility and reliability of uplink scheduling and improving the user experience.

In one embodiment, the X groups of uplink scheduling information include one or more relative relationships among some of the X groups of uplink scheduling information, or include one or more relative relationships among all of the X groups of uplink scheduling information; where a relative relationship comprises phase rotation and/or amplitude scaling.

In this embodiment, the base station can indicate the relative relationship (such as phase rotation and/or amplitude scaling, etc.) among some or all of the X groups of uplink scheduling information to the UE, further increasing the flexibility of uplink scheduling and improving the performance of uplink transmission of the UE.

In one embodiment, the correspondence between the X groups of uplink scheduling information and the N SRS resources is a correspondence pre-agreed by the base station and the UE.

In this embodiment, the base station pre-agrees the correspondence between the X groups of uplink scheduling information and the N SRS resources, then indicates the uplink scheduling information separately to each group of SRS resources based on this correspondence, and then indicates the uplink scheduling information independently for each group of SRS resources of the UE, increasing the flexibility of uplink scheduling and improving the performance of uplink transmission of the UE.

In one embodiment, each group of uplink scheduling information includes a TPMI and/or a transmit layer indicator of an SRS resource corresponding to the each group of uplink scheduling information.

In this embodiment, the base station can indicate the TPMI and/or the number of transmission streams independently for each group of SRS resources of the UE, which is well applicable to the codebook-based uplink transmission mode, improves the flexibility of uplink scheduling and improves the performance of uplink transmission of the UE.

In one embodiment, different groups of uplink scheduling information indicate the same number of transmission streams.

In this embodiment, the base station can indicate the same number of transmission streams for each SRS resource group in the codebook-based uplink transmission mode, which enriches the implementations of uplink scheduling and improves the user experience.

In one embodiment, after the base station receives the SRSs sent by the UE, the method further includes:
  sending, by the base station, SRS resource indication information to the UE, where the SRS resource indication information indicates one or more SRS resources corresponding to each group of uplink scheduling information.

In this embodiment, the base station can send the SRS resource indication information to the UE in the codebook-based uplink transmission mode, to indicate the corresponding SRS resources separately for each SRS resource group, which enriches the implementations of uplink scheduling and improves the user experience.

In one embodiment, each group of SRS resources sent by the UE includes one SRS resource, and different groups of uplink scheduling information correspond to different SRS resources;
  after the base station receives the SRSs sent by the UE, the method further includes:
  determining, by the base station, the number of transmission streams of the uplink signal according to the SRSs sent by the UE; where the number of transmission streams corresponds to all SRS resources corresponding to the X groups of uplink scheduling information;
  indicating, by the base station, the number of transmission streams to the UE.

In this embodiment, the base station can indicate the same number of transmission streams of the uplink signal for each group of SRS resources according to the SRSs sent by the UE in the codebook-based uplink transmission mode, which enriches the implementations of uplink scheduling and improves the user experience.

In one embodiment, sending, by the base station, the X groups of uplink scheduling information to the UE, includes:
  determining, by the base station, a bit width of the X groups of uplink scheduling information in Downlink Control Information (DCI), according to a quantity of antenna ports contained in SRS resources corresponding to the X groups of uplink scheduling information,
  generating, by the base station, the DCI, and
  sending, by the base station, the X groups of uplink scheduling information to the UE through the DCI.

In this embodiment, the base station can determine the bit width of the X groups of uplink scheduling information in the DCI in the codebook-based uplink transmission mode, encode the X groups of uplink scheduling information in the DCI based on the bit width, and then send the X groups of uplink scheduling information to the UE through the DCI, to indicate the uplink scheduling information independently for each group of SRS resources of the UE, increase the flexibility of uplink scheduling and improve the performance of uplink transmission of the UE.

In one embodiment, determining, by the base station, the bit width of the X groups of uplink scheduling information in the DCI, according to the quantity of antenna ports contained in the SRS resources corresponding to the X groups of uplink scheduling information, includes:

determining, by the base station, a bit width of a $k^{th}$ one of the X groups of uplink scheduling information in the DCI, according to a quantity of antenna ports of SRS resources in the group of SRS resources corresponding to the $k^{th}$ group of uplink scheduling information, and k is an integer greater than or equal to 1 and less than or equal to X.

In this embodiment, the base station can determine the bit width of the X groups of uplink scheduling information in the DCI according to the number of antenna ports contained in the SRS resources corresponding to the X groups of uplink scheduling information in the codebook-based uplink transmission mode, and then indicate the uplink scheduling information independently for each antenna panel of the UE through the DCI, increasing the flexibility of uplink scheduling and improving the performance of uplink transmission of the UE.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is independently encoded in the DCI; and the scheduling information of each of the X SRS resources includes the TPMI and/or transmit layer indicator of each SRS resource;

determining, by the base station, a bit width of the X groups of uplink scheduling information in DCI according to the number of antenna ports contained in SRS resources corresponding to the X groups of uplink scheduling information, includes:

determining, by the base station, the bit width of the TPMI and/or transmit layer indicator corresponding to each of the X SRS resources according to the number of antenna ports contained in the SRS resource; or determining, by the base station, the bit width of the TPMI and/or transmit layer indicator corresponding to each SRS resource according to the maximum value of the numbers of antenna ports contained in all of the X SRS resources; or determining, by the base station, the bit width of the TPMI and/or transmit layer indicator corresponding to each of the numbers of antenna ports according to the number of antenna ports contained in each of the X SRS resources, and taking the maximum value in all the determined bit widths as the bit width of the TPMI and/or transmit layer indicator corresponding to each SRS resource.

This embodiment provides a variety of implementations of independently encoding each of the X groups of uplink scheduling information in the DCI based on the number of antenna ports contained in the SRS resources corresponding to the X groups of uplink scheduling information, increasing the flexibility of uplink scheduling and improving the performance of uplink transmission of the UE.

In one embodiment, each group of SRSs sent by the UE corresponds to one SRS resource, and different groups of uplink scheduling information correspond to different SRS resources; the scheduling information of all of X SRS resources corresponding to the X groups of uplink scheduling information is jointly encoded in the DCI; and the scheduling information of each of the X SRS resources includes the TPMI and/or transmit layer indicator of each SRS resource;

determining, by the base station, a bit width of the X groups of uplink scheduling information in DCI according to the number of antenna ports contained in SRS resources corresponding to the X groups of uplink scheduling information, includes:

determining, by the base station, the total bit width of the TPMIs and/or transmit layer indicator corresponding to all the SRS resources according to the sum of possible values of the TPMIs and/or the numbers of transmission streams under the numbers of antenna ports contained in all the SRS resources; or determining, by the base station, the total bit width of the TPMIs and/or transmit layer indicator corresponding to all the SRS resources according to the maximum value among the possible values of the TPMIs and/or the numbers of transmission streams under the numbers of SRS antenna ports contained in all the SRS resources; or determining, by the base station, the total bit width of the TPMIs and/or transmit layer indicators corresponding to all the SRS resources according to the possible values of the TPMIs and/or the numbers of transmission streams under the maximum among the numbers of antenna ports contained in all the SRS resources.

This embodiment provides a variety of implementations of jointly encoding the X groups of uplink scheduling information in the DCI based on the number of antenna ports contained in the SRS resources corresponding to the X groups of uplink scheduling information, increasing the flexibility of uplink scheduling and improving the performance of uplink transmission of the UE.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is independently encoded in the DCI; the scheduling information of one of the X SRS resources includes the TPMI and transmission stream number indicator of the one SRS resource, and the scheduling information of each of the remaining X−1 SRS resources includes the TPMI of the SRS resource; and the transmit layer indicator included in the scheduling information of the one SRS resource indicates the number of transmission streams of each of the X SRS resources simultaneously;

determining, by the base station, a bit width of the X groups of uplink scheduling information in DCI according to the number of antenna ports contained in SRS resources corresponding to the X groups of uplink scheduling information, includes:

determining, by the base station, the bit width of the TPMI and transmit layer indicator of the one SRS resource according to the maximum among the numbers of antenna ports contained in all the SRS resources; and determining the bit width of the TPMI indication information corresponding to each of the remaining X−1 SRS resources according to the number of antenna ports contained in the SRS resource; or determining, by the base station, the bit width of the TPMI and transmit layer indicator of the one SRS resource according to the number of antenna ports contained in the one SRS resource; and determining the bit width of the TPMI indication information corresponding to each of the remaining X−1 SRS resources according to the number of antenna ports contained in the SRS resource; or determining, by the base station, the bit width of the TPMI and transmit layer indicator of the one SRS resource according to the maximum among the numbers of antenna ports contained in all the SRS resources; and determining the bit width of the TPMI indication information corresponding to each of the remaining X−1 SRS resources according to the maximum among the numbers of antenna ports contained in all the SRS resources; or determining, by the base station, the bit width of the TPMI and transmit layer indicator of the one SRS resource according to the number of antenna ports contained in the one SRS resource; and determining the bit width of the TPMI indication information corresponding to each of the remaining X−1 SRS resources according to the maximum among the numbers of antenna ports contained in all the SRS resources; or determining, by the base station, the bit width of the TPMI and transmit layer indicator of the one SRS resource according to the maximum among the numbers of antenna ports contained in all the SRS resources; and determining the bit widths of the TPMIs corresponding to the numbers of antenna ports according to the number of antenna ports contained in each of the X SRS resources, and taking the maximum value thereof as the bit width of the TPMI corresponding to each of the remaining X−1 SRS resources; or determining, by the base station, the bit width of the TPMI and transmit layer indicator of the one SRS resource according to the number of antenna ports contained in the one SRS resource; and determining the bit widths of the TPMIs corresponding to the numbers of antenna ports according to the number of antenna ports contained in each of the X SRS resources, and taking the maximum value thereof as the bit width of the TPMI corresponding to each of the remaining X−1 SRS resources; or determining, by the base station, the bit widths of the TPMIs and the bit widths of the transmit layer indicators corresponding to the numbers of antenna ports according to the number of antenna ports contained in each of the X SRS resources, taking the maximum among the bit widths of the transmission stream number indicators as the bit width of the transmission stream number indicator of the one SRS resource, and taking the maximum among the bit widths of the TPMI indication information as the bit width of the TPMI corresponding to each of the X SRS resources; or determining, by the base station, the bit widths of the TPMIs corresponding to the numbers of antenna ports as well as the jointly-encoded bit widths of the TPMIs and transmit layer indicators corresponding to the numbers of antenna ports according to the number of antenna ports contained in each of the X SRS resources, taking the maximum among the jointly-encoded bit widths of the TPMIs and transmit layer indicators as the bit width of the transmit layer indicator of the one SRS resource, and taking the maximum among the bit widths of the TPMI indication information as the bit width of the TPMI corresponding to each of the X SRS resources.

This embodiment provides a variety of implementations of independently encoding each of the X groups of uplink scheduling information in the DCI based on the number of antenna ports contained in the SRS resources corresponding to the X groups of uplink scheduling information, increasing the flexibility of uplink scheduling and improving the performance of uplink transmission of the UE.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is independently encoded in the DCI; the scheduling information of one of the X SRS resources includes the TPMI and transmit layer indicator of the one SRS resource, and the scheduling information of each of the remaining X−1 SRS resources includes the TPMI of the SRS resource; and the transmit layer indicator included in the scheduling information of the one SRS resource indicates the number of transmission streams of each of the X SRS resources simultaneously;

determining, by the base station, a bit width of the X groups of uplink scheduling information in DCI according to the number of antenna ports contained in SRS resources corresponding to the X groups of uplink scheduling information, includes:

determining, by the base station, the bit width of the TPMI and transmit layer indicator of the one SRS resource according to the maximum among the numbers of antenna ports contained in all the SRS resources; and for each of the remaining X−1 SRS resources, determining the bit width of the TPMI corresponding to the SRS resource according to the number of transmission streams and the number of antenna ports contained in the SRS resource; or determining, by the base station, the bit width of the TPMI and transmit layer indicator of the one SRS resource according to the number of antenna ports contained in the one SRS resource; and for each of the remaining X−1 SRS resources, determining the bit width of the TPMI corresponding to the SRS resource according to the number of transmission streams and the number of antenna ports contained in the SRS resource; or determining, by the base station, the bit width of the TPMI and transmit layer indicator of the one SRS resource according to the maximum among the numbers of antenna ports contained in all the SRS resources; and for each of the remaining X−1 SRS resources, determining the bit widths of the TPMIs corresponding to other SRS resources according to the number of transmission streams and the maximum among the numbers of antenna ports contained in all the SRS resources; or determining, by the base station, the bit width of the TPMI and transmit layer indicator of the one SRS resource according to the number of antenna ports contained in the one SRS resource; and for each of the remaining X−1 SRS resources, determining the bit widths of the TPMIs corresponding to other SRS resources according to the number of transmission streams and the maximum among the numbers of antenna ports contained in all the SRS resources; or determining, by the base station, the bit width of the TPMI and transmit layer indicator of the one SRS resource according to the maximum among the numbers of antenna ports contained in all the SRS resources; and for each of the remaining X−1 SRS resources, determining the bit widths of the TPMIs corresponding to the numbers of antenna ports according to the number of transmission streams and the number of antenna ports contained in each of the X SRS resources, and taking the maximum value thereof as the bit width of the TPMI corresponding to the SRS resource; or determining, by the base station, the bit width of the TPMI and transmit layer indicator of the one SRS resource according to the number of antenna ports contained in the one SRS resource; and for each of the remaining X−1 SRS resources, determining the bit widths of the TPMIs corresponding to the numbers of antenna ports according to the number of transmission streams and the number of antenna ports contained in each of the X SRS resources, and taking the maximum value thereof as the bit width of the TPMI corresponding to the SRS resource; or determining, by the base station, the bit widths of the transmit layer indicators and the bit widths of the TPMIs during single-stream transmission corresponding to the numbers of antenna ports according to the number of antenna ports contained in each of the X SRS resources, taking the maximum among all the determined bit widths of the transmit layer indicators as the bit width of the transmission stream number of the one SRS resource, and taking the maximum among all the determined bit widths of the TPMIs as the bit width of the TPMI corresponding to each of the remaining X−1 SRS resources; or determining, by the base station, the bit widths of the TPMIs during single-stream transmission corresponding to the numbers of antenna ports as well as the jointly-encoded bit widths of the TPMIs and transmit layer indicators corresponding to the numbers of antenna ports according to the number of antenna ports contained in each of the X SRS resources, taking the maximum among all the determined jointly-encoded bit widths of the TPMIs and transmit layer indicators as the bit width of the transmit layer indicator of the one SRS resource, and taking the maximum among the bit widths of the TPMIs during single-stream transmission as the bit width of the TPMI corresponding to each of the remaining X−1 SRS resources.

This embodiment provides a variety of implementations of independently encoding each of the X groups of uplink scheduling information in the DCI based on the number of antenna ports contained in the SRS resources corresponding to the X groups of uplink scheduling information, increasing the flexibility of uplink scheduling and improving the performance of uplink transmission of the UE.

In one embodiment, each group of SRSs sent by the UE corresponds to one SRS resource, and different o groups of uplink scheduling information correspond to different SRS resources; the scheduling information of each of X SRS resources corresponding to the X groups of uplink scheduling information is jointly encoded in the DCI; the scheduling information of one of the X SRS resources includes the TPMI and transmit layer indicator of the one SRS resource, and the scheduling information of each of the remaining X−1 SRS resources includes the TPMI of the SRS resource; and the transmit layer indicator included in the scheduling information of the one SRS resource indicates the number of transmission streams of each of the X SRS resources simultaneously;

determining, by the base station, a bit width of the X groups of uplink scheduling information in DCI according to the number of antenna ports contained in SRS resources corresponding to the X groups of uplink scheduling information, includes:

determining, by the base station, the total bit width of the TPMIs and/or transmit layer indicators corresponding to all the SRS resources according to the sum of possible values of the TPMI and the number of transmission streams under the number of SRS ports contained in one of the X SRS resources and possible values of the TPMIs under the numbers of SRS ports contained in the remaining X−1 SRS resources; or determining, by the base station, the total bit width of the TPMIs and/or transmit layer indicators corresponding to all the SRS resources according to the maximum among possible values of the TPMI and the number of transmission streams under the number of SRS ports contained in one of the X SRS resources and possible values of the TPMIs under the numbers of SRS ports contained in the remaining X−1 SRS resources; or determining, by the base station, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs under the maximum among the numbers of SRS ports contained in the remaining X−1 SRS resources; or determining, by the base station, the total bit width of the TPMIs and/or transmit layer indicators corresponding to all the SRS resources according to the sum of possible values of the TPMI and the number of transmission streams under the number of SRS ports contained in one of the X SRS resources and possible values of the TPMIs under the numbers of SRS ports contained in the remaining X−1 SRS resources under the determined number of transmission streams; or determining, by the base station, the total bit width of the TPMIs and/or transmit layers corresponding to all the SRS resources according to the maximum among possible values of the TPMI and the number of transmission streams under the number of SRS ports contained in one of the X SRS resources and possible values of the TPMIs under the numbers of SRS ports contained in the remaining X−1 SRS resources under the determined number of transmission streams; or determining, by the base station, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs under the maximum among the numbers of SRS ports contained in the remaining X−1 SRS resources under the determined number of transmission streams; or determining, by the base station, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs during single-stream transmission under the numbers of SRS ports contained in the remaining X−1 SRS resources; or determining, by the base station, the total bit width of the TPMIs and/or transmit layer indicators corresponding to all the SRS resources according to the maximum among the possible values of the TPMI and the number of transmission streams under the number of SRS ports contained in one of the X SRS resources and the possible values of the TPMIs during single-stream transmission under the numbers of SRS ports contained in the remaining X−1 SRS resources; or determining, by the base station, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs during single-stream transmission under the maximum among the numbers of SRS ports contained in the remaining X−1 SRS resources.

This embodiment provides a variety of implementations of jointly encoding the X groups of uplink scheduling information in the DCI based on the number of antenna ports contained in the SRS resources corresponding to the X groups of uplink scheduling information, increasing the flexibility of uplink scheduling and improving the performance of uplink transmission of the UE.

In one embodiment, the X groups of uplink scheduling information correspond to X of N groups of SRS resources, the X groups of uplink scheduling information are contained in X SRS resource sets of the N groups of SRS resources, where each group of the X groups of uplink scheduling information is contained in each SRS resource set.

This embodiment is well applicable to the non-codebook-based uplink transmission mode, and indicates the uplink scheduling information independently for each group of SRS resources, increasing the flexibility of uplink scheduling and improving the performance of uplink transmission of the UE.

In one embodiment, each group of uplink scheduling information includes:

an SRS Resource Indicator (SRI) of an SRS resource in an SRS resource set corresponding to the each group of uplink scheduling information, and/or a transmit layer indicator of an SRS resource in an SRS resource set corresponding to the each group of uplink scheduling information.

In this embodiment, the base station can indicate the SRS Resource Indicator (SRI) and/or transmit layer indicator independently for each group of SRS resources in the non-codebook-based uplink transmission mode, increasing the flexibility of uplink scheduling and improving the performance of uplink transmission of the UE.

In one embodiment, after the base station receives the SRSs sent by the UE, the method further includes:

determining, by the base station, the number of transmission streams of the uplink signal according to the SRSs sent by the UE;

indicating the number of transmission streams to the UE, where the number of transmission streams corresponds to all of the X SRS resource sets.

In this embodiment, the base station can indicate the same number of transmission streams of the uplink signal for each group of SRS resources according to the SRSs sent by the UE in the non-codebook-based uplink transmission mode, which enriches the implementations of uplink scheduling and improves the user experience.

In one embodiment, sending, by the base station, the X groups of uplink scheduling information to the UE, includes:

determining, the base station, the bit width of the X groups of uplink scheduling information in the DCI, generating the DCI, and sending the determined X groups of uplink scheduling information to the UE through the DCI.

In this embodiment, the base station can determine the bit width of the X groups of uplink scheduling information in the DCI in the non-codebook-based uplink transmission mode, encode the X groups of uplink scheduling information in the DCI based on the bit width, and then send the X groups of uplink scheduling information to the UE through the DCI, to indicate the uplink scheduling information independently for each group of SRS resources of the UE, increase the flexibility of uplink scheduling and improve the performance of uplink transmission of the UE.

In one embodiment, sending, by the base station, the X groups of uplink scheduling information to the UE, includes:

determining, by the base station, a bit width of the X groups of uplink scheduling information in Downlink Control Information (DCI), according to a quantity of SRS resources contained in SRS resource sets corresponding to the X groups of uplink scheduling information, generating the DCI, and sending, by the base station, the X groups of uplink scheduling information to the UE through the DCI.

In this embodiment, the base station can determine the bit width of the X groups of uplink scheduling information in the DCI in the non-codebook-based uplink transmission mode, encode the X groups of uplink scheduling information in the DCI based on the bit width, and then send the X groups of uplink scheduling information to the UE through the DCI, to indicate the uplink scheduling information independently for each group of SRS resources of the UE, increase the flexibility of uplink scheduling and improve the performance of uplink transmission of the UE.

In one embodiment, the determining, by the base station, the bit width of the X groups of uplink scheduling information in the DCI, according to the quantity of SRS resources contained in the SRS resource sets corresponding to the X groups of uplink scheduling information, includes:

determining, by the base station, a bit width of a $j^{th}$ one of the X groups of uplink scheduling information in the DCI, according to a quantity of SRS resources in an SRS resource set corresponding to the $j^{th}$ group of uplink scheduling information, and j is an integer greater than or equal to 1 and less than or equal to X.

In this embodiment, the base station can determine the bit width of the X groups of uplink scheduling information in the DCI in the non-codebook-based uplink transmission mode, encode the X groups of uplink scheduling information in the DCI based on the bit width, and then send the X groups of uplink scheduling information to the UE through the DCI, to indicate the uplink scheduling information independently for each group of SRS resources of the UE, increase the flexibility of uplink scheduling and improve the performance of uplink transmission of the UE.

In one embodiment, the scheduling information of each of the X SRS resource sets is independently coded in the DCI; and the scheduling information of each of the X SRS resource sets includes the SRI and/or transmit layer indicator of each SRS resource;

determining, by the base station, the bit width of the X groups of uplink scheduling information in the DCI, includes:

determining, by the base station, the bit width of the SRI and/or transmit layer indicator corresponding to one SRS resource set according to the number of SRS resources included in the SRS resource set; or determining, by the base station, the bit width of the SRI and/or transmit layer indicator corresponding to each SRS resource set according to the maximum among the numbers of SRS resources included in all the SRS resource sets; or determining, by the base station, the bit widths of the SRIs and/or transmit layer indicators corresponding to the numbers of SRS resources according to the numbers of SRS resources included in each SRS resource set, and taking the maximum value thereof as the bit width of the SRI and/or transmit layer indicator corresponding to each SRS resource set.

This embodiment provides a variety of implementations of independently encoding each of the X groups of uplink scheduling information in the DCI based on the numbers of SRS resources included in the SRS resource sets corresponding to the X groups of uplink scheduling information, increasing the flexibility of uplink scheduling and improving the performance of uplink transmission of the UE.

In one embodiment, the scheduling information of each of the X SRS resource sets is independently encoded in the DCI; the scheduling information of one of the X SRS resource sets includes the SRI and transmit layer indicator of the one SRS resource set, and the scheduling information of each of the remaining X−1 SRS resource sets includes the SRI of the each SRS resource set; and the transmit layer indicator included in the scheduling information of the one SRS resource set indicates the number of transmission streams of each of the X SRS resource sets simultaneously;

determining, by the base station, the bit width of the X groups of uplink scheduling information in the DCI, includes:

determining, by the base station, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the number of SRS resources contained in the SRS resource set; or determining, by the base station, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the number of SRS resources contained in the SRS resource set; or determining, by the base station, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the maximum among the numbers of SRS resources contained in all the SRS resource sets; or determining, by the base station, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the maximum among the numbers of SRS resources contained in all the SRS resource sets; or determining, by the base station, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the number of SRS resources contained in the SRS resource set and the number of transmission streams; or determining, by the base station, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the number of SRS resources contained in the SRS resource set and the number of transmission streams; or determining, by the base station, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the maximum among the numbers of SRS resources contained in all the SRS resource sets and the number of transmission streams; or determining, by the base station, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the maximum among the numbers of SRS resources contained in all the SRS resource sets and the number of transmission streams; or determining, by the base station, the bit width of the SRI and transmit layer indicator of the one SRS resource set according to the maximum among the numbers of SRS resources contained in all the SRS resource sets; and for each of the remaining X−1 SRS resource sets, determining the bit widths of the SRIs corresponding to the numbers of SRS resources according to the numbers of SRS resources contained in all of the X SRS resource sets, and taking the maximum value thereof as the bit width of the SRI corresponding to each of the remaining X−1 SRS resource sets; or determining, by the base station, the bit width of the SRI and transmit layer indicator of the one SRS resource set according to the number of SRS resources contained in the one SRS resource set; and for each of the remaining X−1 SRS resource sets, determining the bit widths of the SRIs corresponding to the numbers of SRS resources according to the numbers of SRS resources contained in all of the X SRS resource sets, and taking the maximum value thereof as the bit width of the SRI corresponding to each of the remaining X−1 SRS resource sets; or determining, by the base station, the bit widths of the SRIs and the bit widths of the transmit layer indicators corresponding to the numbers of SRS resources according to the numbers of SRS resources contained in all of the X SRS resource sets, taking the maximum among all the determined bit widths of the transmit layer indicators as the bit width of the transmit layer indicator of the one SRS resource set, and taking the maximum among all the determined bit widths of the SRIs as the bit width of the SRI corresponding to each of the X SRS resource sets; or determining, by the base station, the bit widths of the SRIs corresponding to the numbers of SRS resources as well as the jointly-encoded bit widths of the SRIs and transmit layer indicators corresponding to the numbers of SRS resources according to the numbers of SRS resources contained in all of the X SRS resource sets, taking the maximum among all the determined jointly-encoded bit widths of the SRIs and transmit layer indicators as the bit width of the transmit layer indicator of the one SRS resource set, and taking the maximum among all the determined bit widths of the SRIs as the bit width of the SRI corresponding to each of the remaining X−1 SRS resource sets.

This embodiment provides a variety of implementations of independently encoding each of the X groups of uplink scheduling information in the DCI based on the numbers of SRS resources included in the SRS resource sets corresponding to the X groups of uplink scheduling information, increasing the flexibility of uplink scheduling and improving the performance of uplink transmission of the UE.

In a second aspect, an embodiment of the present disclosure provides an uplink transmission method, including:
  receiving, by a UE, a message sent by a base station for instructing the UE to send Sounding Reference Signals (SRSs) corresponding to N groups of SRS resources, where each group of SRS resources comprises one or more SRS resources, and N is a positive integer greater than 1;
  sending, by the UE, the SRSs;
  receiving, by the UE, X groups of uplink scheduling information sent by the base station; where each group of uplink scheduling information corresponds to one of the N groups of SRS resources, different groups of uplink scheduling information correspond to different groups of SRS resources in the N groups of SRS resources, and X is a positive integer greater than 1 and less than 1, or X is a positive integer greater than 1 and equal to N; and
  performing, by the UE, uplink signal transmission according to the X groups of uplink scheduling information.

In one embodiment, one of the X groups of uplink scheduling information corresponds to one antenna panel of the UE.

In one embodiment, sending, by the UE, the SRSs corresponding to the N groups of SRS resources, includes:
  sending, by the UE, the SRSs corresponding to the N groups of SRS resources by using a plurality of antenna panels, where the UE uses different groups of antenna panels to send the SRSs on different groups of SRS resources.

In one embodiment, after the UE receives the message sent by the base station for instructing the UE to send SRSs corresponding to N groups of SRS resources, the method further includes: receiving, by the UE, correspondence information sent by the base station, between the X groups of uplink scheduling information and the N groups of SRS resources.

In one embodiment, the X groups of uplink scheduling information are contained in the DCI or RRC signaling.

In one embodiment, a signaling carrying the uplink scheduling information does not contain an SRS Resource Indicator (SRI) indicating an SRS resource corresponding to X groups of the uplink scheduling information.

In one embodiment, at least one of the X groups of uplink scheduling information contains indication information indicating that the at least one group of uplink scheduling information is not used for the uplink signal transmission.

In one embodiment, before the UE receives the X groups of uplink scheduling information sent by the base station, the method further includes:
  agreeing on, by the UE, the value of X with the base station.

In one embodiment, after the UE sends the SRSs corresponding to the N groups of SRS resources, the method further includes:
  receiving, by the UE, SRS resource set indication information sent by the base station, where the SRS resource set indication information indicates SRS resource sets corresponding to the X groups of uplink scheduling information.

In one embodiment, the X groups of uplink scheduling information include one or more relative relationships among some of the X groups of uplink scheduling information, or include one or more relative relationships among all of the X groups of uplink scheduling information; where a relative relationship comprises phase rotation and/or amplitude scaling.

In one embodiment, the correspondence between the X groups of uplink scheduling information and the N SRS resources is a correspondence pre-agreed by the base station and the UE.

In one embodiment, each group of uplink scheduling information includes:
  a TPMI of an SRS resource corresponding to the each group of uplink scheduling information, and/or a transmit layer indicator of an SRS resource corresponding to the each group of uplink scheduling information.

In one embodiment, different groups of uplink scheduling information indicate an equal number of transmission streams.

In one embodiment, each group of SRS resources sent by the UE includes one SRS resource, and different groups of uplink scheduling information correspond to different SRS resources;
  after the UE sends the SRSs corresponding to the N groups of SRS resources, the method further includes:
  receiving, by the UE, the number of transmission streams of the uplink signal sent by the base station; where the number of transmission streams is the number of transmission streams of the uplink signal determined by the base station according to the SRSs sent by the UE, and the number of transmission streams corresponds to all SRS resources corresponding to the X groups of uplink scheduling information.

In one embodiment, after the UE sends the SRSs corresponding to the N groups of SRS resources, the method further includes:
  receiving, by the UE, SRS resource indication information sent by the base station, where the SRS resource indication information indicates one or more SRS resources corresponding to each group of uplink scheduling information.

In one embodiment, receiving, by the UE, X groups of uplink scheduling information sent by the base station, includes:
  receiving, by the UE, Downlink Control Information (DCI) sent by the base station, and obtaining the X groups of uplink scheduling information from the DCI;
  the receiving, by the UE, the DCI sent by the base station, and obtaining the X groups of uplink scheduling information from the DCI, comprises:
  determining, by the UE, a bit width of the X groups of uplink scheduling information in the DCI according to a quantity of antenna ports contained in SRS resources corresponding to the X groups of uplink scheduling information;

decoding, by the UE, the DCI according to the bit width of the X groups of uplink scheduling information in the DCI to obtain the X groups of uplink scheduling information.

In one embodiment, determining, by the UE, the bit width of the X groups of uplink scheduling information in the DCI according to the quantity of antenna ports contained in the SRS resources corresponding to the X groups of uplink scheduling information, includes:

determining, by the UE, a bit width of a $k^{th}$ one of the X groups of uplink scheduling information in the DCI, according to a quantity of antenna ports of SRS resources in the group of SRS resources corresponding to the $k^{th}$ group of uplink scheduling information, and k is an integer greater than or equal to 1 and less than or equal to X.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is independently encoded in the DCI; and the scheduling information of each of the X SRS resources includes the TPMI and/or transmit layer indicator of each SRS resource;

determining, by the UE, a bit width of the X groups of uplink scheduling information in DCI according to the number of antenna ports contained in SRS resources corresponding to the X groups of uplink scheduling information, includes:

determining, by the base station, the bit width of the TPMI and/or transmit layer indicator corresponding to each of the X SRS resources according to the number of antenna ports contained in the SRS resource; or determining, by the UE, the bit width of the TPMI and/or transmit layer indicator corresponding to each SRS resource according to the maximum value of the numbers of antenna ports contained in all of the X SRS resources; or determining, by the UE, the bit width of the TPMI and/or transmit layer indicator corresponding to each of the numbers of antenna ports according to the number of antenna ports contained in each of the X SRS resources, and taking the maximum value in all the determined bit widths as the bit width of the TPMI and/or transmit layer indicator corresponding to each SRS resource.

In one embodiment, each group of SRSs sent by the UE corresponds to one SRS resource, and different groups of uplink scheduling information correspond to different SRS resources; the scheduling information of all of X SRS resources corresponding to the X groups of uplink scheduling information is jointly encoded in the DCI; and the scheduling information of each of the X SRS resources includes the TPMI and/or transmit layer indicator of each SRS resource;

determining, by the UE, a bit width of the X groups of uplink scheduling information in DCI according to the number of antenna ports contained in SRS resources corresponding to the X groups of uplink scheduling information, includes:

determining, by the UE, the total bit width of the TPMIs and/or transmit layer indicators corresponding to all the SRS resources according to the sum of possible values of the TPMIs and/or the numbers of transmission streams under the numbers of antenna ports contained in all the SRS resources; or determining, by the UE, the total bit width of the TPMIs and/or transmit layer indicators corresponding to all the SRS resources according to the maximum value among the possible values of the TPMIs and/or the numbers of transmission streams under the numbers of SRS antenna ports contained in all the SRS resources; or determining, by the UE, the total bit width of the TPMIs and/or transmit layer indicators corresponding to all the SRS resources according to the possible values of the TPMIs and/or the numbers of transmission streams under the maximum among the numbers of antenna ports contained in all the SRS resources.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is independently encoded in the DCI; the scheduling information of one of the X SRS resources includes the TPMI and transmit layer indicator of the one SRS resource, and the scheduling information of each of the remaining X−1 SRS resources includes the TPMI of the SRS resource; and the transmit layer indicator included in the scheduling information of the one SRS resource indicates the number of transmission streams of each of the X SRS resources simultaneously;

determining, by the UE, a bit width of the X groups of uplink scheduling information in DCI according to the number of antenna ports contained in SRS resources corresponding to the X groups of uplink scheduling information, includes:

determining, by the UE, the bit width of the TPMI and transmit layer indicator of the one SRS resource according to the maximum among the numbers of antenna ports contained in all the SRS resources; and determining the bit width of the TPMI indication information corresponding to each of the remaining X−1 SRS resources according to the number of antenna ports contained in the SRS resource; or determining, by the UE, the bit width of the TPMI and transmit layer indicator of the one SRS resource according to the number of antenna ports contained in the one SRS resource; and determining the bit width of the TPMI indication information corresponding to each of the remaining X−1 SRS resources according to the number of antenna ports contained in the SRS resource; or determining, by the UE, the bit width of the TPMI and transmit layer indicator of the one SRS resource according to the maximum among the numbers of antenna ports contained in all the SRS resources; and determining the bit width of the TPMI indication information corresponding to each of the remaining X−1 SRS resources according to the maximum among the numbers of antenna ports contained in all the SRS resources; or determining, by the UE, the bit width of the TPMI and transmit layer indicator of the one SRS resource according to the number of antenna ports contained in the one SRS resource; and determining the bit width of the TPMI indication information corresponding to each of the remaining X−1 SRS resources according to the maximum among the numbers of antenna ports contained in all the SRS resources; or determining, by the UE, the bit width of the TPMI and transmit layer indicator of the one SRS resource according to the maximum among the numbers of antenna ports contained in all the SRS resources; and determining the bit widths of the TPMIs corresponding to the numbers of antenna ports according to the number of antenna ports contained in each of the X SRS resources, and taking the maximum value thereof as the bit width of the TPMI corresponding to each of the remaining X−1 SRS resources; or determining, by the UE, the bit width of the TPMI and transmit layer indicator of the one SRS resource according to the number of antenna ports contained in the one SRS resource; and determining the bit widths of the TPMIs corresponding to the numbers of antenna ports according to the number of antenna ports contained in each of the X SRS resources, and taking the maximum value thereof as the bit width of the TPMI corresponding to each of the remaining X−1 SRS resources; or determining, by the UE, the bit widths of the TPMIs and the bit widths of the transmit layer indicators corresponding to the numbers of antenna ports according to the number of antenna ports contained in each of the X SRS resources, taking the maximum among the bit widths of the transmit layer indicators as the bit width of the transmit layer indicator of the one SRS resource, and taking the maximum among the bit widths of the TPMI indication information as the bit width of the TPMI corresponding to each of the X SRS resources; or determining, by the UE, the bit widths of the TPMIs corresponding to the numbers of antenna ports as well as the jointly-encoded bit widths of the TPMIs and transmit layer indicators corresponding to the numbers of antenna ports according to the number of antenna ports contained in each of the X SRS resources, taking the maximum among the jointly-encoded bit widths of the TPMIs and transmit layer indicators as the bit width of the transmit layer indicator of the one SRS resource, and taking the maximum among the bit widths of the TPMI indication information as the bit width of the TPMI corresponding to each of the X SRS resources.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is independently encoded in the DCI; the scheduling information of one of the X SRS resources includes the TPMI and transmit layer indicator of the one SRS resource, and the scheduling information of each of the remaining X−1 SRS resources includes the TPMI of the SRS resource; and the transmit layer indicator included in the scheduling information of the one SRS resource indicates the number of transmission streams of each of the X SRS resources simultaneously;

determining, by the UE, a bit width of the X groups of uplink scheduling information in DCI according to the number of antenna ports contained in SRS resources corresponding to the X groups of uplink scheduling information, includes:

determining, by the UE, the bit width of the TPMI and transmit layer indicator of the one SRS resource according to the maximum among the numbers of antenna ports contained in all the SRS resources; and for each of the remaining X−1 SRS resources, determining the bit width of the TPMI corresponding to the SRS resource according to the number of transmission streams and the number of antenna ports contained in the SRS resource; or determining, by the UE, the bit width of the TPMI and transmit layer indicator of the one SRS resource according to the number of antenna ports contained in the one SRS resource; and for each of the remaining X−1 SRS resources, determining the bit width of the TPMI corresponding to the SRS resource according to the number of transmission streams and the number of antenna ports contained in the SRS resource; or determining, by the UE, the bit width of the TPMI and transmit layer indicator of the one SRS resource according to the maximum among the numbers of antenna ports contained in all the SRS resources; and for each of the remaining X−1 SRS resources, determining the bit widths of the TPMIs corresponding to other SRS resources according to the number of transmission streams and the maximum among the numbers of antenna ports contained in all the SRS resources; or determining, by the UE, the bit width of the TPMI and transmit layer indicator of the one SRS resource according to the number of antenna ports contained in the one SRS resource; and for each of the remaining X−1 SRS resources, determining the bit widths of the TPMIs corresponding to other SRS resources according to the number of transmission streams and the maximum among the numbers of antenna ports contained in all the SRS resources; or determining, by the UE, the bit width of the TPMI and transmit layer indicator of the one SRS resource according to the maximum among the numbers of antenna ports contained in all the SRS resources; and for each of the remaining X−1 SRS resources, determining the bit widths of the TPMIs corresponding to the numbers of antenna ports according to the number of transmission streams and the number of antenna ports contained in each of the X SRS resources, and taking the maximum value thereof as the bit width of the TPMI corresponding to the SRS resource; or determining, by the UE, the bit width of the TPMI and transmit layer indicator of the one SRS resource according to the number of antenna ports contained in the one SRS resource; and for each of the remaining X−1 SRS resources, determining the bit widths of the TPMIs corresponding to the numbers of antenna ports according to the number of transmission streams and the number of antenna ports contained in each of the X SRS resources, and taking the maximum value thereof as the bit width of the TPMI corresponding to the SRS resource; or determining, by the UE, the bit widths of the transmit layer indicators and the bit widths of the TPMIs during single-stream transmission corresponding to the numbers of antenna ports according to the number of antenna ports contained in each of the X SRS resources, taking the maximum among all the determined bit widths of the transmit layer indicators as the bit width of the transmit layer indicator of the one SRS resource, and taking the maximum among all the determined bit widths of the TPMIs as the bit width of the TPMI corresponding to each of the remaining X−1 SRS resources; or determining, by the UE, the bit widths of the TPMIs during single-stream transmission corresponding to the numbers of antenna ports as well as the jointly-encoded bit widths of the TPMIs and transmit layer indicators corresponding to the numbers of antenna ports according to the number of antenna ports contained in each of the X SRS resources, taking the maximum among all the determined jointly-encoded bit widths of the TPMIs and transmit layer indicators as the bit width of the transmit layer indicator of the one SRS resource, and taking the maximum among the bit widths of the TPMIs during single-stream transmission as the bit width of the TPMI corresponding to each of the remaining X−1 SRS resources.

In one embodiment, each group of SRSs sent by the UE corresponds to one SRS resource, and different groups of uplink scheduling information correspond to different SRS resources; the scheduling information of each of X SRS resources corresponding to the X groups of uplink scheduling information is jointly encoded in the DCI; the scheduling information of one of the X SRS resources includes the TPMI and transmit layer indicator of the one SRS resource, and the scheduling information of each of the remaining X−1 SRS resources includes the TPMI of the SRS resource; and the transmit layer indicator included in the scheduling information of the one SRS resource indicates the number of transmission streams of each of the X SRS resources simultaneously;

determining, by the UE, a bit width of the X groups of uplink scheduling information in DCI according to the number of antenna ports contained in SRS resources corresponding to the X groups of uplink scheduling information, includes:

determining, by the UE, the total bit width of the TPMIs and/or transmit layer indicators corresponding to all the SRS resources according to the sum of possible values of the TPMI and the number of transmission streams under the number of SRS ports contained in one of the X SRS resources and possible values of the TPMIs under the numbers of SRS ports contained in the remaining X−1 SRS resources; or determining, by the UE, the total bit width of the TPMIs and/or transmit layer indicators corresponding to all the SRS resources according to the maximum among possible values of the TPMI and the number of transmission streams under the number of SRS ports contained in one of the X SRS resources and possible values of the TPMIs under the numbers of SRS ports contained in the remaining X−1 SRS resources; or determining, by the UE, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs under the maximum among the numbers of SRS ports contained in the remaining X−1 SRS resources; or determining, by the UE, the total bit width of the TPMIs and/or transmit layer indicators corresponding to all the SRS resources according to the sum of possible values of the TPMI and the number of transmission streams under the number of SRS ports contained in one of the X SRS resources and possible values of the TPMIs under the numbers of SRS ports contained in the remaining X−1 SRS resources under the determined number of transmission streams; or determining, by the UE, the total bit width of the TPMIs and/or transmit layer indicators corresponding to all the SRS resources according to the maximum among possible values of the TPMI and the number of transmission streams under the number of SRS ports contained in one of the X SRS resources and possible values of the TPMIs under the numbers of SRS ports contained in the remaining X−1 SRS resources under the determined number of transmission streams; or determining, by the UE, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs under the maximum among the numbers of SRS ports contained in the remaining X−1 SRS resources under the determined number of transmission streams; or determining, by the UE, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs during single-stream transmission under the numbers of SRS ports contained in the remaining X−1 SRS resources; or determining, by the UE, the total bit width of the TPMIs and/or transmit layer indicators corresponding to all the SRS resources according to the maximum among the possible values of the TPMI and the number of transmission streams under the number of SRS ports contained in one of the X SRS resources and the possible values of the TPMIs during single-stream transmission under the numbers of SRS ports contained in the remaining X−1 SRS resources; or determining, by the UE, the total bit width of the TPMIs and/or transmit layer indicators corresponding to all the SRS resources according to the possible values of the TPMI and the number of transmission streams under the number of SRS ports contained in one of the X SRS resources and the possible values of the TPMIs during single-stream transmission under the maximum among the numbers of SRS ports contained in the remaining X−1 SRS resources.

In one embodiment, the X groups of uplink scheduling information are contained in X SRS resource sets of the N groups of SRS resources, where each group of the X groups of uplink scheduling information is contained in each SRS resource set.

In one embodiment, each X group of uplink scheduling information comprises: an SRS Resource Indicator (SRI) of an SRS resource in an SRS resource set corresponding to the each group of uplink scheduling information, and/or a transmit layer indicator of an SRS resource in an SRS resource set corresponding to the each group of uplink scheduling information.

In one embodiment, the receiving, by the UE, the X groups of uplink scheduling information sent by the base station, includes:

receiving, by the UE, DCI sent by the base station, and obtaining the X groups of uplink scheduling information from the DCI;

the receiving, by the UE, DCI sent by the base station, and obtaining the X groups of uplink scheduling information from the DCI, comprises:

determining, by the UE, a bit width of the X groups of uplink scheduling information in the DCI according to a quantity of SRS resources contained in SRS resource sets corresponding to the X groups of uplink scheduling information;

decoding, by the UE, the DCI according to the bit width of the X groups of uplink scheduling information in the DCI to obtain the X groups of uplink scheduling information.

In one embodiment, the determining, by the UE, the bit width of the X groups of uplink scheduling information in the DCI, according to the quantity of SRS resources contained in the SRS resource sets corresponding to the X groups of uplink scheduling information, includes:
determining, by the UE, a bit width of a $j^{th}$ one of the X groups of uplink scheduling information in the DCI, according to a quantity of SRS resources in an SRS resource set corresponding to the $j^{th}$ group of uplink scheduling information, and j is an integer greater than or equal to 1 and less than or equal to X.

In one embodiment, the scheduling information of each of the X SRS resource sets is independently coded in the DCI; and the scheduling information of each of the X SRS resource sets includes the SRI and/or transmit layer indicator of each SRS resource;
determining, by the UE, the bit width of the X groups of uplink scheduling information in the DCI, includes:
determining, by the UE, the bit width of the SRI and/or transmit layer indicator corresponding to one SRS resource set according to the number of SRS resources included in the SRS resource set; or
determining, by the UE, the bit width of the SRI and/or transmit layer indicator corresponding to each SRS resource set according to the maximum among the numbers of SRS resources included in all the SRS resource sets; or
determining, by the UE, the bit widths of the SRIs and/or transmit layer indicators corresponding to the numbers of SRS resources according to the numbers of SRS resources included in all of the X SRS resource sets, and taking the maximum value thereof as the bit width of the SRI and/or transmit layer indicator corresponding to each SRS resource set.

In one embodiment, the scheduling information of each of the X SRS resource sets is independently encoded in the DCI; the scheduling information of one of the X SRS resource sets includes the SRI and transmit layer indicator of the one SRS resource set, and the scheduling information of each of the remaining X−1 SRS resource sets includes the SRI of the each SRS resource set; and the transmit layer indicator included in the scheduling information of the one SRS resource set indicates the number of transmission streams of each of the X SRS resource sets simultaneously;
determining, by the UE, the bit width of the X groups of uplink scheduling information in the DCI, includes:
determining, by the UE, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the number of SRS resources contained in the SRS resource set; or
determining, by the UE, the bit width of the SRI and transmit layer of the one SRS resource set according to the number of SRS resources contained in the one SRS resource set; and for each of the remaining X−1 SRS resource sets, determining the bit width of the SRI corresponding to the SRS resource set according to the number of SRS resources contained in the SRS resource set; or
determining, by the UE, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the maximum among the numbers of SRS resources contained in all the SRS resource sets; or
determining, by the UE, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the maximum among the numbers of SRS resources contained in all the SRS resource sets; or
determining, by the UE, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the number of SRS resources contained in the SRS resource set and the number of transmission streams; or
determining, by the UE, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the number of SRS resources contained in the SRS resource set and the number of transmission streams; or
determining, by the UE, the bit width of the SRI and transmit layer indicator of the one SRS resource set according to the maximum among the numbers of SRS resources contained in all the SRS resource sets; and for each of the remaining X−1 SRS resource sets, determining the bit width of the SRI corresponding to the SRS resource set according to the maximum among the numbers of SRS resources contained in all the SRS resource sets and the number of transmission streams; or
determining, by the UE, the bit width of the SRI and transmit layer indicator of the one SRS resource set according to the number of SRS resources contained in the one SRS resource set; and for each of the remaining X−1 SRS resource sets, determining the bit width of the SRI corresponding to the SRS resource set according to the maximum among the numbers of SRS resources contained in all the SRS resource sets and the number of transmission streams; or
determining, by the UE, the bit width of the SRI and transmit layer indicator of the one SRS resource set according to the maximum among the numbers of SRS resources contained in all the SRS resource sets; and for each of the remaining X−1 SRS resource sets, determining the bit widths of the SRIs corresponding to the numbers of SRS resources according to the numbers of SRS resources contained in all of the X SRS resource sets, and taking the maximum value thereof as the bit width of the SRI corresponding to each of the remaining X−1 SRS resource sets; or
determining, by the UE, the bit width of the SRI and transmit layer indicator of the one SRS resource set according to the number of SRS resources contained in the one SRS resource set; and for each of the remaining X−1 SRS resource sets, determining the bit widths of the SRIs corresponding to the numbers of SRS resources according to the numbers of SRS resources contained in all of the X SRS resource sets, and taking the maximum value thereof as the bit width of the SRI corresponding to each of the remaining X−1 SRS resource sets; or determining, by the UE, the bit widths of the SRIs and the bit widths of the transmit layer indicators corresponding to the numbers of SRS resources according to the numbers of SRS resources contained in all of the X SRS resource sets, taking the maximum among all the determined bit widths of the transmit layer indicators as the bit width of the transmission stream number indicator of the one SRS resource set, and taking the maximum among all the determined bit widths of the SRIs as the bit width of the SRI corresponding to each of the X SRS resource sets; or determining, by the UE, the bit widths of the SRIs corresponding to the numbers of SRS resources as well as the jointly-encoded bit widths of the SRIs and transmit layer indicators corresponding to the numbers of SRS resources according to the numbers of SRS resources contained in all of the X SRS resource sets, taking the maximum among all the determined jointly-encoded bit widths of the SRIs and transmit layer indicators as the bit width of the transmit layer indicator of the one SRS resource set, and taking the maximum among all the determined bit widths of the SRIs as the bit width of the SRI corresponding to each of the remaining X−1 SRS resource sets.

In a third aspect, an embodiment of the present disclosure further provides an uplink transmission apparatus, including:

a sending device configured to instruct a User Equipment (UE) to send Sounding Reference Signals (SRSs) corresponding to N groups of SRS resources, where each group of SRS resources comprises one or more SRS resources, and N is a positive integer greater than 1;

a receiving device configured to receive the SRSs sent by the UE;

a processing device configured to determine X groups of uplink scheduling information; where each group of uplink scheduling information corresponds to one of the N groups of SRS resources, different groups of uplink scheduling information correspond to different groups of SRS resources in the N groups of SRS resources, and X is a positive integer greater than 1 and less than N, or X is a positive integer greater than 1 and equal to N;

the sending device being further configured to send the X groups of uplink scheduling information to the UE for the UE performing uplink signal transmission according to the X groups of uplink scheduling information.

In one embodiment, one of the X groups of uplink scheduling information corresponds to one antenna panel of the UE.

In one embodiment, the SRSs are sent by the UE using a plurality of antenna panels, where the SRSs are sent by the UE, using different groups of antenna panels, on different groups of SRS resources.

In one embodiment, the sending device is further configured to:

send the correspondence information between the X groups of uplink scheduling information and the N groups of SRS resources to the UE after instructing the UE to send the SRSs corresponding to the N groups of SRS resources.

In one embodiment, a signaling carrying the uplink scheduling information does not contain an SRS Resource Indicator (SRI) indicating an SRS resource corresponding to the uplink scheduling information.

In one embodiment, at least one of the X groups of uplink scheduling information contains indication information indicating that the at least one group of uplink scheduling information is not used for the uplink signal transmission.

In one embodiment, the device is further configured to:

agree on the value of X with the UE before determining the X groups of uplink scheduling information.

In one embodiment, the sending device is further configured to:

send the resource set indication information to the UE after the receiving device receives the SRSs sent by the UE, where the SRS resource set indication information indicates SRS resource sets corresponding to the uplink scheduling information.

In one embodiment, the X groups of uplink scheduling information include one or more relative relationships among some of the X groups of uplink scheduling information, or include one or more relative relationships among all of the X groups of uplink scheduling information; and a relative relationship comprises phase rotation and/or amplitude scaling.

In one embodiment, each group of uplink scheduling information includes: a TPMI of an SRS resource corresponding to the each group of uplink scheduling information, and/or a transmit layer indicator of an SRS resource corresponding to the each group of uplink scheduling information.

In one embodiment, different groups of uplink scheduling information indicate the same number of transmission streams.

In one embodiment, the sending device is further configured to:

send the SRS resource indication information to the UE after the receiving device receives the SRSs sent by the UE based on the instruction, where the SRS resource indication information indicates one or more SRS resources corresponding to each group of uplink scheduling information.

In one embodiment, the sending device is specifically configured to:

determine a bit width of the X groups of uplink scheduling information in DCI, according to a quantity of antenna ports contained in SRS resources corresponding to the X groups of uplink scheduling information; generate the DCI, and send the X groups of uplink scheduling information to the UE through the DCI.

In one embodiment, the sending device is configured to:

determining a bit width of a $k^{th}$ one of the X groups of uplink scheduling information in the DCI, according to a quantity of antenna ports of SRS resources in the group of SRS resources corresponding to the $k^{th}$ group of uplink scheduling information, and k is an integer greater than or equal to 1 and less than or equal to X.

In one embodiment, the X groups of uplink scheduling information are contained in X SRS resource sets of the N groups of SRS resources, where each group of the X groups of uplink scheduling information is contained in each SRS resource set.

In one embodiment, each group of uplink scheduling information comprises:

an SRI of an SRS resource in an SRS resource set corresponding to the each group of uplink scheduling information, and/or a transmit layer indicator of an SRS resource in an SRS resource set corresponding to the each group of uplink scheduling information.

In one embodiment, the sending device is configured to: determine a bit width of the X groups of uplink scheduling information in DCI, according to a quantity of SRS resources contained in SRS resource sets corresponding to the X groups of uplink scheduling information; generate the DCI, and send the X groups of uplink scheduling information to the UE through the DCI.

In one embodiment, the sending device is specifically configured to:
determine a bit width of a $j^{th}$ one of the X groups of uplink scheduling information in the DCI, according to a quantity of SRS resources in an SRS resource set corresponding to the $j^{th}$ group of uplink scheduling information, where j is an integer greater than or equal to 1 and less than or equal to X.

In a fourth aspect, an embodiment of the present disclosure further provides an uplink transmission apparatus, including:
a receiving device configured to receive a message sent by a base station for instructing the apparatus to send Sounding Reference Signals (SRSs) corresponding to N groups of SRS resources, where each group of SRS resources comprises one or more SRS resources, and N is a positive integer greater than 1;
a sending device configured to send the SRSs;
the receiving device being further configured to: receive X groups of uplink scheduling information sent by the base station; where each group of uplink scheduling information corresponds to one of the N groups of SRS resources, different groups of uplink scheduling information correspond to different groups pf SRS resources in the N groups of SRS resources, and X is a positive integer greater than 1 and less than 1, or X is a positive integer greater than 1 and equal to N;
a processing device configured to perform uplink signal transmission according to the X groups of uplink scheduling information.

In one embodiment, one of the X groups of uplink scheduling information corresponds to one antenna panel of the apparatus.

In one embodiment, the sending device is configured to:
send the SRSs corresponding to the N groups of SRS resources by using a plurality of antenna panels, where the UE uses different groups of antenna panels to send the SRSs on different groups of SRS resources.

In one embodiment, the receiving device is further configured to:
receive the correspondence information between the X groups of uplink scheduling information and the N groups of SRS resources sent by the base station after receiving the message sent by the base station for instructing the apparatus to send the SRSs corresponding to the N groups of SRS resources.

In one embodiment, a signaling carrying the uplink scheduling information does not contain an SRS Resource Indicator (SRI) indicating an SRS resource corresponding to X groups of the uplink scheduling information.

In one embodiment, at least one of the X groups of uplink scheduling information contains indication information indicating that the at least one group of uplink scheduling information is not used for the uplink signal transmission.

In one embodiment, the processing device is further configured to:
agree on the value of X with the base station before the receiving device receives the X groups of uplink scheduling information sent by the base station.

In one embodiment, the receiving device is further configured to:
receive the SRS resource set indication information sent by the base station after the sending device sends the SRSs corresponding to the N groups of SRS resources, where the SRS resource set indication information indicates SRS resource sets corresponding to the X groups of uplink scheduling information.

In one embodiment, the X groups of uplink scheduling information include one or more relative relationships among some of the X groups of uplink scheduling information, or include one or more relative relationships among all of the X groups of uplink scheduling information; and a relative relationship comprises phase rotation and/or amplitude scaling.

In one embodiment, each group of uplink scheduling information comprises:
a TPMI of an SRS resource corresponding to the each group of uplink scheduling information, and/or a transmit layer indicator of an SRS resource corresponding to the each group of uplink scheduling information.

In one embodiment, different groups of uplink scheduling information indicate the same number of transmission streams.

In one embodiment, the receiving device is further configured to:
receive the SRS resource indication information sent by the base station after the sending device sends the SRSs corresponding to the N groups of SRS resources, where the SRS resource indication information indicates one or more SRS resources corresponding to each group of uplink scheduling information.

In one embodiment, the receiving device is further configured to:
receive X groups of uplink scheduling information sent by the base station, which includes:
receiving DCI sent by the base station, and obtaining the X groups of uplink scheduling information from the DCI;
the processing device is configured to: determine a bit width of the X groups of uplink scheduling information in the DCI according to a quantity of antenna ports contained in SRS resources corresponding to the X groups of uplink scheduling information; decode the DCI according to the bit width of the X groups of uplink scheduling information in the DCI to obtain the X groups of uplink scheduling information.

In one embodiment, the processing device is configured to:
determine a bit width of a $k^{th}$ one of the X groups of uplink scheduling information in the DCI, according to a quantity of antenna ports of SRS resources in the group of SRS resources corresponding to the $k^{th}$ group of uplink scheduling information, and k is an integer greater than or equal to 1 and less than or equal to X.

In one embodiment, the X groups of uplink scheduling information are contained in X SRS resource sets of the N groups of SRS resources, and each group of the X groups of uplink scheduling information is contained in each SRS resource set.

In one embodiment, each X group of uplink scheduling information includes: an SRI of an SRS resource in an SRS resource set corresponding to the each group of uplink scheduling information, and/or a transmit layer indicator of an SRS resource in an SRS resource set corresponding to the each group of uplink scheduling information.

In one embodiment, the receiving device is further configured to:
receive X groups of uplink scheduling information sent by the base station, which includes:
receiving DCI sent by the base station, and obtaining the X groups of uplink scheduling information from the DCI;
the processing device is configured to: determine a bit width of the X groups of uplink scheduling information in the DCI according to a quantity of SRS resources contained in SRS resource sets corresponding to the X groups of uplink scheduling information; decode the DCI according to the bit width of the X groups of uplink scheduling information in the DCI to obtain the X groups of uplink scheduling information.

In one embodiment, the processing device is configured to:
determine a bit width of a $j^{th}$ one of the X groups of uplink scheduling information in the DCI, according to a quantity of SRS resources in an SRS resource set corresponding to the $j^{th}$ group of uplink scheduling information, and j is an integer greater than or equal to 1 and less than or equal to X.

In a fifth aspect, an embodiment of the present disclosure provides an uplink transmission device, including:
at least one processor, and
a memory and a communication interface communicatively connected to the at least one processor;
and the memory stores instructions that can be executed by the at least one processor, and the at least one processor performs the method described in the first or second aspect of the embodiments of the disclosure via the communication interface by executing the instructions stored in the memory.

In a sixth aspect, an embodiment of the disclosure provides a computer readable storage medium storing the computer instructions, which cause a computer to perform the method described in the first or second aspect of the embodiments of the disclosure when running on the computer.

Embodiments of the disclosure, the base station instructs the UE to send the SRSs corresponding to N groups of SRS resources, then determines X groups of uplink scheduling information based on the received SRSs sent by the UE, and sends the determined X groups of uplink scheduling information to the UE, and each of the X groups of uplink scheduling information corresponds to one of the N groups of SRS resources, and different groups of uplink scheduling information correspond to different groups of SRS resources, so that the UE can perform, according to each group of uplink scheduling information, the uplink signal transmission by using the uplink transmission characteristics when sending the SRS corresponding to this group of uplink scheduling information after receiving the X groups of uplink scheduling information, improving the flexibility of uplink scheduling.

BRIEF DESCRIPTION OF THE DRAWINGS

In order to illustrate the embodiments of the disclosure more clearly, the accompanying figures which need to be used in describing the embodiments will be introduced below briefly. The accompanying figures described below are only some embodiments of the disclosure, and other accompanying figures can also be obtained.

DETAILED DESCRIPTION OF THE EMBODIMENTS

Figure 1:
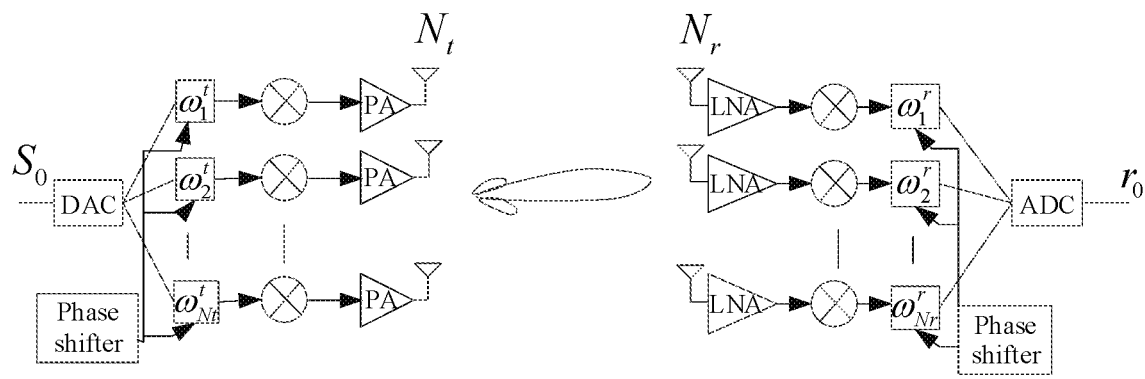
FIG. 1 is a schematic diagram of performing the analog beamforming on intermediate frequency signals.

In The embodiments of the disclosure will be described clearly and completely below in combination with the accompanying drawings in the embodiments of the disclosure. The described embodiments are a part of the embodiments of the disclosure but not all the embodiments.

It should be understood that the embodiments of the disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the disclosure. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the disclosure, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the disclosure.

It should be understood that the word such as "first" or "second" in the description of the embodiments of the present disclosure is only for purpose of distinguishing the description, and cannot be construed to indicate or imply the relative importance and cannot be construed to indicate or imply the order either. In the description of the embodiments of the present disclosure, "a plurality of" refers to two or more.

The term "and/or" in the embodiments of the present disclosure is simply an association relationship describing the associated objects, indicating that there may be three relationships, for example, A and/or B may represent: only A, both A and B, and only B. Furthermore, the character "/" herein generally indicates that the associated objects have a kind of "or" relationship.

In the prior art, for a physical uplink shared channel transmission, a base station may send a group of uplink scheduling information for a user equipment, where the uplink scheduling information may include the TPMI, transmit layer indicator, and uplink SRS indicator, etc., and the TPMI and transmit layer indicator or the SRS resource indicator in the group of uplink scheduling information is/are used only to indicate the information corresponding to one SRS resource set corresponding to the PUSCH, where one SRS resource set is a group of SRS resources and may include one or more SRS resources. This approach limits the flexibility of uplink scheduling.

Further, in view of the important effect of the Multiple-Input Multiple-Output (MIMO) technology in increasing the peak rate and system spectrum utilization, the LTE/LTE-A and other wireless access technical standards are all established based on the "MIMO+OFDM" technologies, i.e., MIMO combined with Orthogonal Frequency Division Multiplexing. The performance gain of the MIMO technology is based on the spatial degree of freedom obtained by the multi-antenna system, so the most important evolution direction of the MIMO technology in the standardization development process is the dimension expansion.

In the LTE Rel-8, at most 4 layers of MIMO transmission can be supported. The Rel-9 puts emphasis on enhancing the Multi-User MIMO (MU-MIMO) technology, and at most 4 downlink data layers can be supported in the MU-MIMO transmission of the Transmission Mode (TM)-8. The Rel-10 introduces the support of 8 antenna ports, to further increase the spatial resolution of the channel state information and further extend the transmission capability of the Single-User MIMO (SU-MIMO) to up to at most 8 data layers. The Rel-13 and Rel-14 introduce the Full-Dimension MIMO (FD-MIMO) technology supporting 32 ports, to implement the full-dimension and vertical beam-forming.

In order to further improve the MIMO technology, the large-scale antenna technology is introduced into the mobile communication system. For the base station, the fully digital large-scale antenna can have up to 128/256/512 antenna devices and up to 128/256/512 transceiver devices, where each antenna device is connected to one transceiver device. The pilot signals of up to 128/256/512 antenna ports are transmitted, allowing the UE to measure channel state information and feed it back. For the UE, the antenna array with up to 32/64 antenna devices can be configured. The huge beam-forming gain is obtained through the beam-formings at the base station and UE sides, to compensate for the signal attenuation caused by the path loss. Particularly for the high frequency communication, e.g., at the frequency point of 30 GHz, the path loss causes the extremely limited coverage range of the wireless signal. With the large-scale antenna technology, the coverage range of the wireless signal can be extended to the usable range.

Figure 2:
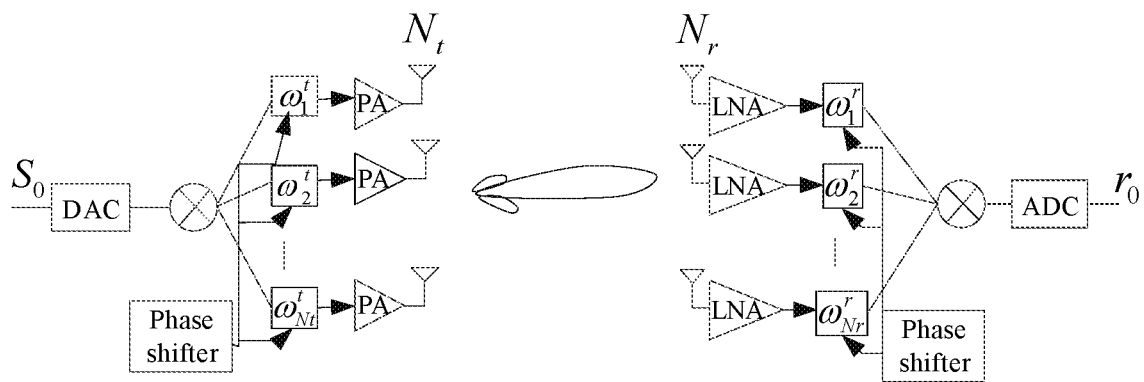
FIG. 2 is a schematic diagram of performing the analog beamforming on radio frequency signals.

In the fully-digital antenna array, each antenna device has an independent transceiver device, which will greatly increase the size, cost and power consumption of the device. Especially for the Analog-to-Digital Converter (ADC) and Digital to Analog Converter (DAC) of the transceiver device, the power consumption has only been reduced by about 1/10 and the performance improvement is also relatively limited in the past ten years. In order to reduce the size, cost, and power consumption of the device, an embodiment of the disclosure based on analog beamforming is proposed. As shown in FIG. 1 and FIG. 2, the main feature of analog beamforming is to weight and shape the intermediate frequency signal (FIG. 1) or radio frequency signal (FIG. 2) through a phase shifter. The advantage is that each transmitting (receiving) antenna has only one transceiver device, which is simple to be implemented and reduces the cost, size and power consumption.

Figure 3:
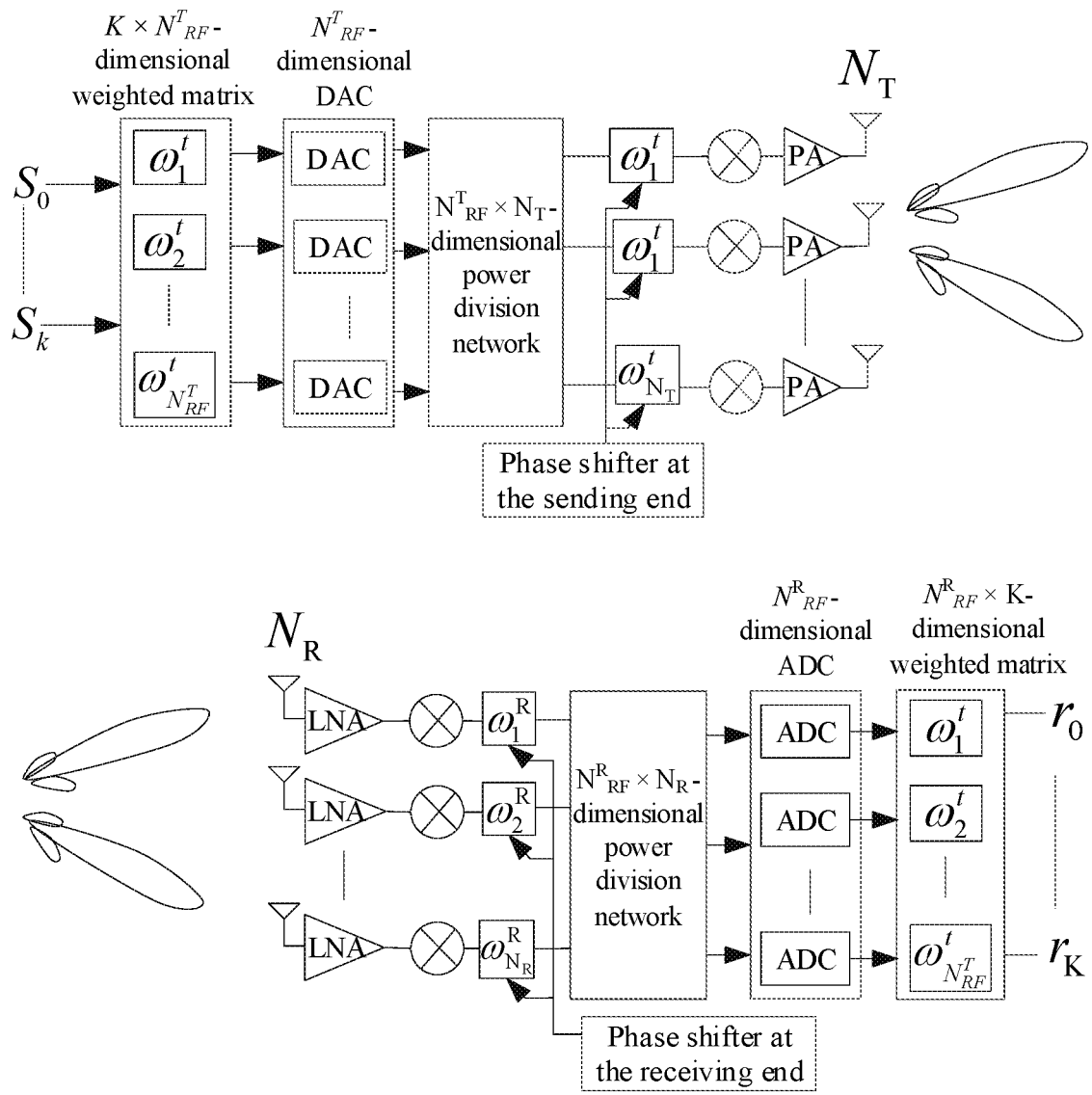
FIG. 3 is a schematic diagram of the digital-analog hybrid beamforming.

In order to further improve the performance of analog beamforming, a transceiver architecture scheme of digital-analog hybrid beamforming is proposed. As shown in FIG. 3, there are $N_{FF}^T$ and $N_{FF}^R$ transceiver devices respectively at the transmitting end and the receiving end, the number of antenna devices at the transmitting end is $N^T$, which is greater than $N_{FF}^T$, the number of antenna devices at the receiving end is $N^R$, which is greater than $N_{FF}^R$; and the maximum number of parallel transmission streams supported by beamforming is $\min(N_{FF}^T, N_{FF}^R)$. The hybrid beamforming structure in FIG. 3 balances the flexibility of the digital beamforming and the low complexity of the analog beamforming, and has the ability to support the simultaneous forming of a plurality of data streams and a plurality of UEs. At the same time, the complexity is also controlled to be within a reasonable range.

Both the analog beamforming and the digital-analog hybrid beamforming need to adjust the analog beamforming weights at the transmitting and receiving ends to align the resulting beams with their respective opposite ends of the communication. For the downlink transmission, the beamforming weights sent by the base station side and the beamforming weights received by the UE side need to be adjusted, while for the uplink transmission, the beamforming weights sent by the UE side and received by the base station side need to be adjusted. The beamforming weights are usually obtained by sending the training signals. In the downlink direction, the base station sends a downlink beam training signal; and the UE measures the downlink beam training signal, selects the best transmission beam of the base station, and feeds back the beam-related information to the base station, and simultaneously selects the corresponding best reception beam and saves it locally.

A UE equipped with a plurality of transmitting antennas can perform the uplink beamforming. In order to determine the uplink UL beamforming matrix, the UE in the RRC-_CONNECTED state can be semi-statically configured with multiple uplink SRS resources specific to the UE. The SRS signal transmitted on each SRS resource uses a particular beamforming matrix for beamforming. The UE sends these SRS resources on the uplink. The base station (Transmission/Reception Point (TRP)) measures the signal quality of different SRS resources and selects the preferred SRS resource. The TRP sends an index (SRS Resource Indicator (SRI)) of the selected SRS resource to the UE via the Downlink Control Information (DCI). The UE can infer which uplink beamforming matrix (for example, SRS resource) is recommended by the TRP for future uplink transmission based on the SRI. Then the UE can use the uplink beamforming matrix indicated by the SRI for future uplink transmission.

The uplink SRS can also be used to obtain the Channel State Information (CSI). The SRS can be used to estimate the uplink channel information of each UE. Based on this, the Channel Quality Indicator (CQI), transmission TPMI, Transmit Rank Indicator (TRI) and other information of the UE are obtained, so that the base station can determine the resource scheduling of the UE. For the TDD system, in addition to the above-mentioned functions, by using the reciprocity of the channel, the base station can also obtain the downlink channel state through the SRS, which provides convenience for downlink transmission. When the base station configures multiple SRS resources for the UE, the base station can indicate the SRS resource selected by the base station to the UE through the SRI, helping the UE to determine the antenna and transmitting precoding corresponding to the uplink transmission, the receiving precoding corresponding to the downlink transmission, etc. The precoding here can be digital beamforming/precoding, or analog beamforming/precoding, or digital-analog hybrid beamforming/precoding.

For example, when the uplink transmission is codebook-based uplink transmission, the base station can configure an SRS resource set containing multiple SRS resources for the UE to acquire the uplink CSI, where each SRS resource can contain one or more antenna ports. The UE sends the corresponding SRS according to the configuration information of the SRS resource sent by the base station. The base station sends the SRI, TPMI and TRI information to the UE according to the received SRS. According to the SRI, the UE can determine the SRS resource selected by the base station, and thus determine that the uplink transmission uses the same antenna, antenna port and analog beamforming as the SRS transmission corresponding to the SRS resource. Through the TPMI and TRI information of the SRS resource corresponding to the SRI, the UE can further determine the precoding matrix and the number of transmission streams of the uplink transmission.

For another example, when the uplink transmission is non-codebook-based uplink transmission, the base station may configure an SRS resource set containing multiple SRS resources for the UE to acquire the uplink CSI, where each SRS resource contains 1 antenna port. The base station indicates the SRS resources selected by the base station to the UE through the SRI. According to the SRI, the UE can determine that the uplink transmission uses the same precoding as that used for sending the SRS corresponding to the SRS resources indicated by the SRI. The number of SRS resources indicated by the SRI is equal to the number of streams of the uplink transmission.

Currently, the UE may have a plurality of antenna panels (also called antenna arrays) for uplink transmission. Each antenna panel consists of a group of antenna devices (including one or more antenna devices). The exact number of antenna panels, the number of antenna devices, and the arrangement of antenna devices in each panel are implementation issues, and different UEs can have different implementations. The UE can send one data layer from one panel at a time, or the UE can send one data layer from a plurality of antenna panels at the same time. When this transmission method for data layer is applied to the SRS transmission, the UE can send one SRS port at a time from one panel, or the UE can send one SRS port from multiple antenna panels at the same time. In the prior art, the UE can use a plurality of antenna panels to perform the data transmission simultaneously during uplink transmission, but it is impossible for the base station to distinguish whether the UE uses a plurality of antenna panels for transmission, so the base station cannot indicate the uplink scheduling information (such as precoding matrix, sending amplitude, etc.) independently for each antenna panel of the UE, which greatly limits the performance of the uplink transmission of the UE.

Figure 4:
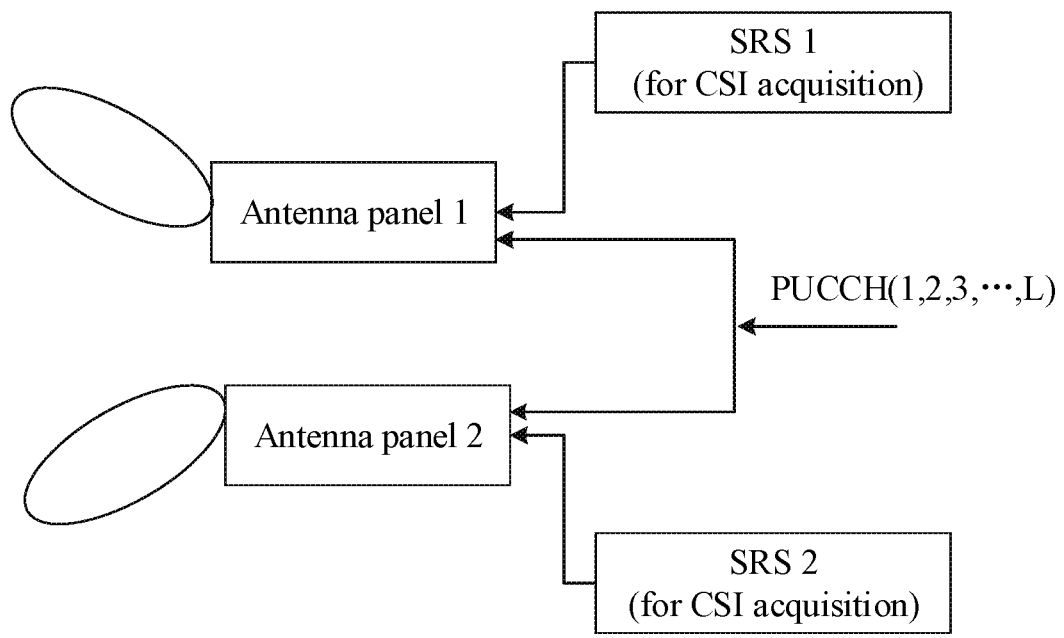
FIG. 4 is a schematic diagram of multi-antenna panel transmission.

In Embodiments of the present disclosure provide an uplink transmission method, which can be applicable to the case where one data layer of the physical uplink shared channel transmitted by one or more panels of the UE. N1 represents the number of physical antenna panels of the UE. FIG. 4 is a schematic diagram of the PUSCH transmission when N1=2, in which the data layers 1 . . . L can be sent respectively through the antenna panel 1 and the antenna panel 2. Although FIG. 4 uses N1=2 as an example to illustrate the solution, it should be understood that the embodiments of the present disclosure can be extended to the cases where there are more than two antenna panels.

Figure 5:
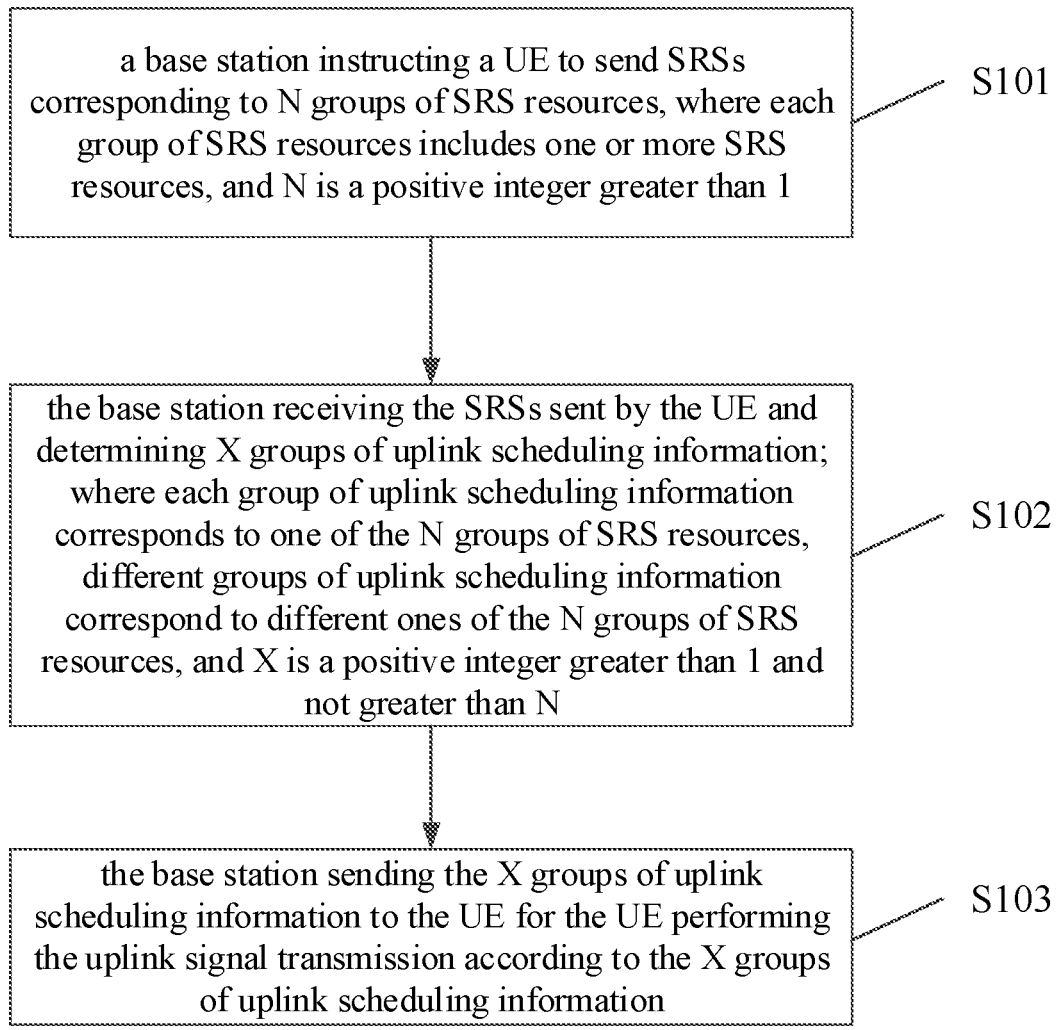
FIG. 5 is a schematic flowchart of an uplink transmission method in an embodiment of the present disclosure.

Referring to FIG. 5, an embodiment of the present disclosure provides an uplink transmission method, including as follows.

S101, a base station instructing a UE to send SRSs corresponding to N groups of SRS resources, where each group of SRS resources includes one or more SRS resources, and N is a positive integer greater than 1.

Correspondingly, the UE receives the configuration information of M uplink SRS resources indicated by the base station, and uses N groups of SRS resources among the M uplink SRS resources to send the SRSs based on the configuration information; where the M SRS resources can be divided into N SRS resource groups, and a group of SRS resources is composed of one or more SRS resources among the M SRS resources.

In some embodiments of the present disclosure, one group of SRS resources may correspond to one SRS resource set, and one SRS set may include one or more SRS resources.

The base station can configure N SRS resource sets corresponding to the PUSCH for the user terminal. For example, a configuration method that can correspond to the 3GPP protocol is: the parameter txConfig in the high-level parameter PUSCH-Config is configured as 'codebook' (or 'nonCodebook'), and the usage in the high-level parameter SRS-ResourceSet corresponding to N SRS resource sets is configured as 'codebook' (or 'nonCodebook'), and each SRS resource set corresponds to a group of SRS resources.

Further, the base station may instruct the user terminal to send the SRSs corresponding to the N SRS resource sets. Here, for periodic SRS resources, the UE sends the SRSs periodically as long as it receives the configuration information; for non-periodic SRS resources or semi-persistent SRS resources, the US can be instructed by the base station to send the SRSs through the trigger signaling or activation signaling.

In some embodiments of the present disclosure, the UE may have a plurality of antenna panels, and the SRSs may be sent by the UE by using the plurality of antenna panels, where the UE may use different groups of antenna panels to send SRSs on different groups of SRS resources.

In a specific implementation process, which antenna panel of the UE transmits which group of SRS resources may be an implementation problem of the UE, and may be transparent to the base station, that is, the base station may not know which antenna panel the UE uses to transmit which group of SRS resources. The UE may also indicate the correspondence between the antenna panels used by the UE and the SRS resources to the base station through signaling, or the base station may indicate the correspondence between the SRS resources and the antenna panels of the UE through signaling.

S102, the base station receiving the SRSs sent by the UE and determining X groups of uplink scheduling information; where each group of uplink scheduling information corresponds to one of the N groups of SRS resources, different groups of uplink scheduling information correspond to different ones of the N groups of SRS resources, and X is a positive integer greater than 1 and not greater than N.

In a specific implementation process, the X groups of uplink scheduling information may be included in the uplink grant (UL grant) information.

S103, the base station sending the X groups of uplink scheduling information to the UE for the UE performing the uplink signal transmission according to the X groups of uplink scheduling information.

Correspondingly, the UE receives the X groups of uplink scheduling information sent by the base station, and controls the uplink transmission corresponding to each group of SRS resources based on the correspondence between SRS resource groups and uplink scheduling information.

Further, when the UE uses different groups of antenna panels to send SRSs on different groups of SRS resources and after the UE receives the X groups of uplink scheduling information sent by the base station, the UE may further determine the uplink scheduling information corresponding to each antenna panel based on the correspondence between SRS resource groups and antenna panels as well as the correspondence between SRS resource groups and uplink scheduling information, where one of the X groups of uplink scheduling information corresponds to one antenna panel of the UE, and control the antenna panel corresponding to each group of uplink scheduling information to perform the uplink transmission based on the each group of uplink scheduling information.

In the above solution, the base station instructs the UE to send the SRSs corresponding to N groups of SRS resources, then determines X groups of uplink scheduling information based on the received SRSs sent by the UE, and sends the determined X groups of uplink scheduling information to the UE, where each group of uplink scheduling information corresponds to one of the N groups of SRS resources, and different groups of uplink scheduling information correspond to different groups of SRS resources, so that the UE can perform, after receiving the X groups of uplink scheduling information, according to each group of uplink scheduling information, the uplink signal transmission by using the uplink transmission characteristics of the SRS transmission corresponding to the each group of uplink scheduling information, improving the flexibility of uplink scheduling.

Also, when the UE uses different antenna panels to send the SRSs on different groups of SRS resources, the base station determines, after determining the uplink scheduling information corresponding to each of received groups of SRS resources, respectively according to the SRS of this group of SRS resources, different groups of SRS resources corresponding to different groups of uplink scheduling information, and then the effect of indicating the uplink scheduling information independently for the antenna panel corresponding to each group of SRS resources, is implemented by indicating the uplink scheduling information separately to each group of SRS resources, increasing the flexibility of uplink scheduling and improving the performance of uplink transmission of the UE.

In one embodiment, after the base station instructs the UE to send the SRSs corresponding to the N groups of SRS resources, the base station sends the correspondence information between the X groups of uplink scheduling information and a plurality of antenna panels of the UE.

Here, the correspondence information may be: different groups of uplink scheduling information correspond to different antenna panels; or at least two different groups of uplink scheduling information correspond to the same antenna panel; or the correspondence between uplink scheduling information and antenna panels of the UE; or different groups of SRS resources correspond to different antenna panels; or at least two different groups of SRS resources correspond to the same antenna panel; or indicating the correspondence between each group of SRS resources of the UE and antenna panels of the UE.

In this embodiment, the base station sends the correspondence information between the X groups of uplink scheduling information and a plurality of antenna panels of the UE to the UE, so that the UE can transmit uplink signals based on the correspondence, increasing the flexibility of uplink scheduling and improving the performance of uplink transmission of the UE.

In one embodiment, the X groups of uplink scheduling information may be included in the DCI or Radio Resource Control (RRC) information.

This embodiment saves the signaling overhead of the communication system and improves the user experience.

In one embodiment, if X<N, the DCI may also contain the information about the SRS resource groups corresponding to X groups of uplink scheduling information selected from N groups of SRS resources.

This embodiment increases the flexibility of uplink scheduling, saves the signaling overhead of the communication system and improves the user experience.

In one embodiment, a signaling carrying the uplink scheduling information does not contain a SRI of the SRS resource corresponding to the uplink scheduling information. This embodiment increases the flexibility of uplink scheduling and improves the user experience.

In one embodiment, at least one of the X groups of uplink scheduling information contains indication information indicating that the at least one group of uplink scheduling information is not used for the uplink signal transmission.

Correspondingly, the corresponding UE-side behavior includes: the transmission of uplink signals (such as PUSCH, PUCCH, etc.) does not correspond to the SRS resources corresponding to these uplink scheduling information not used for the uplink signal transmission. That is, the SRS resources used to determine the related information (such as information on precoding and/or transmission stream number) of the uplink signal transmission do not include these SRS resources corresponding to these uplink scheduling information, and the precoding matrices used to determine the uplink signal transmission does not include the precoding matrices indicated by these uplink scheduling information.

Furthermore, the UE does not use the antenna panels corresponding to these SRS resources when sending uplink signals.

This embodiment increases the flexibility of uplink scheduling and improves the user experience.

In one embodiment, before the base station determines the X groups of uplink scheduling information, the method further includes: the base station agrees on the value of X with the UE.

Here, the agreement mode may be protocol agreement, or may be sending a signaling by the base station to the UE to indicate the X.

For example, the protocol agrees that X=N.

For example, the protocol agrees that X is equal to the number of SRS resource sets configured by the base station for the UE.

For example, the base station sends a limit signaling of the maximum number of SRS resources to the UE.

For example, the base station sends a limit signaling of the maximum number of SRS resource sets to the UE.

For example, the base station sends an indication signaling of the number of SRS resource groups to the UE.

For example, the base station sends an indication signaling of the number of uplink scheduling information groups to the UE.

This embodiment increases the flexibility and reliability of uplink scheduling and improves the user experience.

In one embodiment, after the base station receives the SRSs sent by the UE, the method further includes: the base station sends the resource set indication information to the UE, where the SRS resource set indication information indicates an SRS resource set corresponding to the uplink scheduling information.

In a specific implementation process, the SRS resource set indication information may be sent in the same DCI as the X groups of uplink scheduling information, or in a different DCI.

In this embodiment, the base station indicates the resource set for uplink transmission for each antenna panel by sending the SRS resource set indication information to the UE, increasing the flexibility and reliability of uplink scheduling and improving the user experience.

In one embodiment, the correspondence between the X groups of uplink scheduling information and the N SRS resources is a correspondence pre-agreed by the base station and the UE.

In this embodiment, the base station pre-agrees the correspondence between the X groups of uplink scheduling information and the N SRS resources, then indicates the uplink scheduling information separately to each group of SRS resources based on this correspondence, and then indicates the uplink scheduling information independently for each antenna panel of the UE, increasing the flexibility of uplink scheduling and improving the performance of uplink transmission of the UE.

In one embodiment, after receiving the SRSs sent by the UE, the base station may further determine the relative relationship(s) among some or all of the X groups of uplink scheduling information, and indicate the relative relationship(s) among some or all groups of uplink scheduling information to the UE.

In a specific implementation process, the relative relationship(s) among some or all of the X groups of uplink scheduling information may be included in the X groups of uplink scheduling information.

In a specific implementation process, the relative relationship may specifically include phase rotation and/or amplitude scaling. Correspondingly, the UE scales the sending amplitude of each antenna panel according to the amplitude scaling and then performs the PUSCH transmission, and/or rotates the phase of each antenna panel according to the phase rotation and then performs the PUSCH transmission.

In a specific implementation process, the amplitude scaling and/or phase rotation information may specifically be the amplitude scaling and/or phase rotation of each antenna panel relative to a reference antenna panel.

Here, the amplitude scaling can be an independent field in the UL grant information. Taking N1=2 as an example, the base station may send an amplitude scaling factor to the UE to indicate the amplitude scaling of the antenna panel 2 relative to the antenna panel 1. For example, the amplitude scaling factor indicates that, when the UE performs the PUSCH transmission, the power of data that needs to be sent on the antenna panel 2 is 4 times the power of the data sent on the antenna panel 1. Similarly, the phase rotation signaling can also be an independent field in the UL grant information.

In a specific implementation process, the amplitude scaling and/or phase rotation information is included in the antenna panel-specific scheduling information of other antenna panels except the reference antenna panel.

In a specific implementation process, the amplitude scaling and/or phase rotation signaling takes the form of precoding among antenna panels. For example, the base station may send a TPMI_antenna panel indication information (i.e., indication information related to TPMI) to the UE to indicate the amplitude scaling and/or phase rotation relationship among the antenna panels. Taking N1=2 as an example, assuming that the precoding indicated by the TPMI_antenna panel indication information sent by the base station to the UE is $$\begin{bmatrix} 1 \\ j \end{bmatrix},$$

it means that the UE uses, when PUSCH is transmitted on the antenna panel 1, the precoding matrix indicated by the TPMI indicated in the antenna panel-specific scheduling information corresponding to the antenna panel 1 to precode, and when the PUSCH is transmitted on the antenna panel 2, it is necessary to multiply every element of the precoding matrix indicated by the TPMI indicated in the antenna panel-specific scheduling information corresponding to the antenna panel 2 by a factor j as the precoding of the antenna panel 2.

In this embodiment, the base station can indicate the relative relationship(s) (such as phase rotation and/or amplitude scaling, etc.) among some or all of the X groups of uplink scheduling information for each antenna panel of the UE, so that the UE scales the sending amplitude of each antenna panel according to the amplitude scaling and then performs the PUSCH transmission, and/or rotates the phase of each antenna panel according to the phase rotation and then performs the PUSCH transmission. This embodiment further increases the flexibility of uplink scheduling and improves the performance of uplink transmission of the UE.

In one embodiment, the base station sends the determined X groups of uplink scheduling information to the UE, which specifically includes: the base station determines the bit width of the X groups of uplink scheduling information in the DCI, generates the DCI, and sends the determined X groups of uplink scheduling information to the UE through the DCI.

Correspondingly, after receiving the DCI sent by the base station, the UE determines the bit width of the X groups of uplink scheduling information in the DCI, and decodes the DCI according to the bit width of the X groups of uplink scheduling information in the DCI to obtain the X groups of uplink scheduling information.

In a specific implementation process, for different transmission modes, the content included in each group of uplink scheduling information can be different. For example, in the codebook-based transmission mode, the X groups of uplink scheduling information can include the TPMI and/or transmit layer indicator corresponding to each group of SRS resources. The TPMI and/or transmit layer indicator is, for example, the field of Precoding information and number of layers in the DCI in 3GPP TS38.212. In the non-codebook-based transmission mode, the X groups of uplink scheduling information can include the SRI and/or transmit layer indicator corresponding to each group of SRS resources. The two cases will be respectively introduced below in detail.

(1) In the codebook-based transmission mode, the X groups of uplink scheduling information include the TPMI and/or transmit layer indicator corresponding to each group of SRS resources.

In this case, the base station may determine the bit width of the X groups of uplink scheduling information in the DCI according to the number of antenna ports contained in SRS resources corresponding to the X groups of uplink scheduling information.

For example, the base station determines the bit width of the $k^{th}$ one of the X groups of uplink scheduling information in the DCI according to the number of antenna ports contained in SRS resources in a group of SRS resources corresponding to the $k^{th}$ group of uplink scheduling information, and k is an integer greater than or equal to 1 and less than or equal to X.

In specific implementation processes, the X groups of uplink scheduling information can indicate the TPMI and/or transmit layer indicator corresponding to each group of SRS resources in different ways. The specific indication ways include but not limited to the following three ways.

In a first way: each group of SRSs sent by the UE corresponds to one SRS resource, and different ones of the X groups of uplink scheduling information correspond to different SRS resources; and the scheduling information of each of X SRS resources corresponding to the X groups of uplink scheduling information, includes the TPMI and transmit layer indicator of each SRS resource, where the numbers of transmission streams indicated by all of the X groups of uplink scheduling information may be the same or different, which is not specifically limited in the embodiments of the present disclosure.

In a specific implementation process, the scheduling information of each of X SRS resources corresponding to the X groups of uplink scheduling information can be independently encoded in the DCI or jointly encoded in the DCI, which is not specifically limited in the embodiments of the present disclosure.

When the scheduling information of each of X SRS resources corresponding to the X groups of uplink scheduling information is independently encoded in the DCI, the step in which the base station determines the bit width of the X groups of uplink scheduling information in the DCI according to the number of antenna ports contained in SRS resources corresponding to the X groups of uplink scheduling information includes: the base station determines the bit width of the TPMI and transmit layer indicator corresponding to each of the X SRS resources, according to the number of antenna ports contained in the SRS resource; or the base station determines the bit width of the TPMI and transmit layer indicator corresponding to each SRS resource, according to the maximum among the numbers of antenna ports contained in all of the X SRS resources; or the base station determines the bit widths of the TPMI and transmit layer indicator, each corresponding to the number of antenna ports of each of the X SRS resources, according to the number of antenna ports contained in the each of the X SRS resources, and takes the maximum among all the determined bit widths as the bit width of the TPMI and transmit layer indicator corresponding to each SRS resource. The bit width(s) of the TPMI and transmit layer indicator means that the bit width(s) of the field of Precoding information and number of layers in the DCI.

When the scheduling information of each of X SRS resources corresponding to the X groups of uplink scheduling information is jointly encoded in the DCI, the step in which the base station determines the bit width of the X groups of uplink scheduling information in the DCI, according to the number of antenna ports contained in SRS resources corresponding to the X groups of uplink scheduling information includes: the base station determines the total bit width of the TPMIs and transmit layer indicators corresponding to all the SRS resources, according to the sum of possible values of the TPMIs and the numbers of transmission streams under the numbers of antenna ports contained in all the SRS resources; or the base station determines the total bit width of the TPMIs and transmit layer indicators corresponding to all the SRS resources, according to the maximum among the possible values of the TPMIs and the numbers of transmission streams under the numbers of antenna ports contained in all the SRS resources; or the base station determines the total bit width of the TPMIs and transmit layer indicators corresponding to all the SRS resources, according to the possible values of the TPMIs and the numbers of transmission streams under the maximum among the numbers of antenna ports contained in all the SRS resources.

For example, taking N1=2 as an example, it is assumed that the base station configures two SRS resources for CSI acquisition for the UE, where the first SRS resource includes P1 SRS ports and the second SRS resource includes P2 SRS ports. Then the bit width of the TPMI and TRI indication information corresponding to the first SRS resource is the bit width of the TPMI and TRI indication information under the codebook corresponding to P1 antenna ports, and the bit width of the TPMI and TRI indication information corresponding to the second SRS resource is the bit width of the TPMI and TRI indication information under the codebook corresponding to P2 antenna ports. This can be expressed by formula as: assuming that the possible value of the TPMI and TRI corresponding to the number of SRS ports contained in the $m^{th}$ SRS resource is $R_m$, and the bit width of the TPMI and TRI corresponding to the $m^{th}$ SRS resource is $\lceil \log_2(R_m) \rceil$ bits, then the total bit width of the TPMIs and TRIs is $$\sum_{m=1}^{M} \lceil \log_2(R_m) \rceil$$

bits. After determining the bit width of the TPMI and TRI, the base station encodes the TPMI and TRI under the bit width and instructs the UE.

For example, it is assumed that the bit width of the TPMI and TRI corresponding to the number of SRS ports contained in $m^{th}$ SRS resources is $O_m$ bits, and the total bit width of the TPMIs and TRIs is $$M \times \max_{1 \le m \le M} (O_m)$$

bits. Still taking N1=2 as an example, it is assumed that the base station configures two SRS resources for CSI acquisition for the UE, where the first SRS resource includes P1 SRS ports, the second SRS resource includes P2 SRS ports, P1>P2, and the bit width ($O_1$ bits) of the TPMI and TRI under the codebook corresponding to P1 is greater than the bit width ($O_2$ bits) of the TPMI and TRI under the codebook corresponding to P2. Then the TPMI and TRI corresponding to the first SRS resource is the bit width ($O_1$ bits) of the TPMI and TRI under the codebook corresponding to P1 antenna ports, and the TPMI and TRI corresponding to the second SRS resource is also the bit width ($O_1$ bits) of the TPMI and TRI under the codebook corresponding to P1 antenna ports. Then the total bit width of the TPMIs and TRIs is $2*O_1$ bits. This can be expressed by formula as: assuming that the possible value of the TPMI and TRI corresponding to the number of SRS ports contained in the $m^{th}$ SRS resource is $R_m$ and the bit width of the TPMI and TRI corresponding to the $m^{th}$ SRS resource is $\lceil \log_2(R_m) \rceil$ bits, then the total bit width of the TPMIs and TRIs is $$M \times \max_{1 \leq m \leq M} \lceil \log_2(R_m) \rceil$$

bits. Another way is that the total bit width of the TPMIs and TRIs is a function of the maximum possible value of the TPMIs and TRIs corresponding to all SRS resources, for example, $$M \times \left\lceil \log_2\left(\max_{1 \leq m \leq M}(R_m)\right) \right\rceil$$

bits. After determining the bit width of the TPMI and TRI, the base station encodes the TPMI and TRI under the bit width and instructs the UE.

For example, assuming that the bit width of the TPMI and transmit layer indicator is determined, by the UE, as $\lceil \log_2(R_{sum}) \rceil$ bits according to the sum of possible value of the TRMI ($R_{sum}$) under the number of SRS ports contained in each SRS resource. Another bit width of the TPMI and TRI is the bit width determined according to the maximum number of possible values of the TPMI and TRI under the number of SRS ports contained in each SRS resource. For example, assuming that the possible value of the TPMI and TRI corresponding to the number of SRS ports contained in the $m^{th}$ SRS resource is $R_m$, then the total bit width of the TPMIs and TRIs is $$\left\lceil \log_2\left(M \max_{1 \leq m \leq M}(R_m)\right) \right\rceil$$

bits. After determining the bit width of the TPMI and TRI, the base station encodes the TPMI and TRI under the bit width and instructs the UE.

Correspondingly, the UE determines the bit width of the TPMI and TRI in the same way, and decodes the TPMI and TRI in the corresponding decoding way to obtain the precoding matrix and the number of transmission streams corresponding to each antenna panel. According to the TPMI and TRI indicated by the uplink scheduling information as well as the SRS resource corresponding to the uplink scheduling information, the UE determines that the PUSCH corresponds to the precoding and the number of transmission streams of the data stream corresponding to the uplink scheduling information. The UE integrates all uplink scheduling indication information to determine the total precoding and transmission stream of the PUSCH, and then performs the PUSCH transmission.

It should be noted that the above-mentioned TPMI and TRI indicator indication information can be independently encoded, that is, the TPMI is carried in an independent information field or parameter, and transmit layer indicator is carried in another independent information field or parameter; or it can be jointly encoded, that is, the TPMI and TRI are carried by the same information field or the same parameter.

In a second way: each group of SRSs sent by the UE corresponds to one SRS resource, and different ones of the X groups of uplink scheduling information correspond to different SRS resources; and the scheduling information of each of X SRS resources corresponding to X groups of uplink scheduling information includes the TPMI of each SRS resource.

The number of transmission streams of each antenna panel can be separately indicated by the base station to the UE. For example, in addition to X groups of scheduling information, the UL grant information may further include the independent transmission stream number indication information, which may be determined by the base station according to the SRSs sent by the UE after the base station receives and measures the SRSs sent by the UE based on the instruction. This transmission stream number indication information may indicate that all SRS resources correspond to the same number of transmission streams.

In a specific implementation process, the scheduling information of each of X SRS resources corresponding to the X groups of uplink scheduling information can be independently encoded in the DCI or jointly encoded in the DCI, which is not specifically limited in the embodiments of the present disclosure.

When the scheduling information of each of X SRS resources corresponding to the X groups of uplink scheduling information is independently encoded in the DCI, the step in which the base station determines the bit width of the X groups of uplink scheduling information in the DCI according to the number of antenna ports contained in SRS resources corresponding to the X groups of uplink scheduling information includes: the base station determines the bit width of the TPMI corresponding to each of the X SRS resources, according to the number of antenna ports contained in the SRS resource; or the base station determines the bit width of the TPMI corresponding to each SRS resource, according to the maximum among the numbers of antenna ports contained in all of the X SRS resources; or the base station determines the bit widths of the TPMI, each corresponding to the number of antenna ports of each of the X SRS resources, according to the number of antenna ports contained in the each of the X SRS resources, and takes the maximum among all the determined bit widths as the bit width of the TPMI corresponding to each SRS resource.

When the scheduling information of each of X SRS resources corresponding to the X groups of uplink scheduling information is jointly encoded in the DCI, the step in which the base station determines the bit width of the X groups of uplink scheduling information in the DCI according to the number of antenna ports contained in SRS resources corresponding to the X groups of uplink scheduling information includes: the base station determines the total bit width of the TPMIs corresponding to all the SRS resources according to the sum of possible values of the TPMIs and the numbers of transmission streams under the numbers of antenna ports contained in all the SRS resources; or the base station determines the total bit width of the TPMIs corresponding to all the SRS resources according to the maximum among the possible values of the TPMIs and the numbers of transmission streams under the numbers of antenna ports contained in all the SRS resources; or the base station determines the total bit width of the TPMIs corresponding to all the SRS resources according to the possible values of the TPMIs and the numbers of transmission streams under the maximum among the numbers of antenna ports contained in all the SRS resources.

For example, the number of antenna panels is represented by N1. Assuming N1=4, in the codebook under 4 antennas, there are L1 precoding matrices corresponding to the transmission with 1-layer (i.e., RI=1), L2 precoding matrices corresponding to the transmission with 2-layer (i.e., RI=2), L3 precoding matrices corresponding to the transmission with 3-layer (i.e., RI=3), and L4 precoding matrices corresponding to the transmission with 4-layer (i.e., RI=4), where max(L1, L2, L3, L4)=L1, and the bit width of the TPMI corresponding to the number of SRS ports (Pm) contained in the $m^{th}$ SRS resource is determined according to L1. For example, the bit width of the TPMI corresponding to the number of SRS ports (Pm) contained in the $m^{th}$ SRS resource is $\lceil \log_2(L_1) \rceil$ bits. After determining the bit width of the TPMI, the base station encodes the TPMI under the bit width to generate the TPMI indication signaling, and instruct it to the UE.

For example, it is assumed that the bit width of the TPMI corresponding to the number of SRS ports contained in $m^{th}$ SRS resources is $O_m$ bits, then the bit width of the TPMI corresponding to each SRS resource is $$\max_{1 \le m \le M}(O_m)$$

bits, and the total bit width of the TPMIs and TRIs is $$M \times \max_{1 \le m \le M}(O_m)$$

bits. This can be expressed by formula as: assuming that the possible value of the TPMI corresponding to the number of SRS ports contained in the $m^{th}$ SRS resource is Rm, and the bit width of the TPMI corresponding to the $m^{th}$ SRS resource is $\lceil \log_2(R_m) \rceil$ bits, then the total bit width of the TPMIs is $$M \times \max_{1 \le m \le M} \lceil \log_2(R_m) \rceil$$

bits. Another way is that the total bit width of the TPMIs is a function of the maximum possible value of the TPMIs corresponding to all SRS resources, for example, $$M \times \lceil \log_2\left( \max_{1 \le m \le M}(R_m) \right) \rceil$$

bits. In one embodiment, the bit width of the TPMI corresponding to the number of SRS ports (Pm) contained in the $m^{th}$ SRS resource is determined according to the maximum number of the precoding matrices corresponding to each rank transmission in the codebook under N1 antenna panels. After determining the bit width of the TPMI, the base station encodes the TPMI under the bit width to generate the TPMI indication signaling, and instruct it to the UE.

For example, the bit width determined by the base station according to the sum ($R_{sum}$) of the possible values of TPMIs under the number of SRS ports contained in each SRS resource is $\lceil \log_2(R_{sum}) \rceil$ bits. Another way is that the bit width of the TPMI is determined according to the maximum number of possible values of the TPMI under the number of SRS ports contained in each SRS resource. Assuming that the possible value of the TPMI corresponding to the number of SRS ports contained in the $m^{th}$ SRS resource is Rm, then the total bit width of the TPMIs is $$\lceil \log_2\left( M \max_{1 \le m \le M}(R_m) \right) \rceil$$

bits. In one embodiment, the number of possible values of the TPMI corresponding to the number of SRS ports (Pm) contained in the $m^{th}$ SRS resource is the maximum number of the precoding matrices corresponding to each rank transmission in the codebook under N1 antenna panels. After determining the bit width of the TPMI, the base station encodes the TPMI under the bit width to generate the TPMI indication signaling, and instruct it to the UE.

Correspondingly, the UE determines the bit width of the TPMI in the same way, and decodes the TPMI in the corresponding decoding way to obtain the precoding matrix and the number of transmission streams corresponding to each antenna panel. According to the TPMI and TRI indicated by the uplink scheduling information as well as the SRS resource corresponding to the uplink scheduling information, the UE determines that the PUSCH corresponds to the precoding and the number of transmission streams of the data stream corresponding to the uplink scheduling information. The UE integrates all uplink scheduling indication information to determine the total precoding and transmission stream of the PUSCH, and then performs the PUSCH transmission.

In a third way: each group of SRSs sent by the UE corresponds to one SRS resource, and different ones of the X groups of uplink scheduling information correspond to different SRS resources; the scheduling information of one of X SRS resources corresponding to X groups of uplink scheduling information includes the TPMI and transmit layer indicator of the one SRS resource, and the scheduling information of each of the remaining X−1 SRS resources includes the TPMI of the SRS resource. The transmit layer indicator included in the scheduling information of the one SRS resource indicates the number of transmission streams of each of the X SRS resources simultaneously.

In a specific implementation process, the scheduling information of each of X SRS resources corresponding to the X groups of uplink scheduling information can be independently encoded in the DCI or jointly encoded in the DCI, which is not specifically limited in the embodiments of the present disclosure.

When the scheduling information of each of the X SRS resources corresponding to the X groups of uplink scheduling information is independently encoded in the DCI, the step in which the base station determines the bit width of the X groups of uplink scheduling information in the DCI according to the number of antenna ports contained in SRS resources corresponding to the X groups of uplink scheduling information includes:

the base station determines the bit width of the TPMI and transmit layer indicator of the one SRS resource according to the maximum among the numbers of antenna ports contained in all the SRS resources; and determines the bit width of the TPMI indication information corresponding to each of the remaining X−1 SRS resources according to the number of antenna ports contained in the SRS resource; or the base station determines the bit width of the TPMI and transmit layer indicator of the one SRS resource according to the number of antenna ports contained in the one SRS resource; and determines the bit width of the TPMI indication information corresponding to each of the remaining X−1 SRS resources according to the number of antenna ports contained in the SRS resource; or the base station determines the bit width of the TPMI and transmit layer indicator of the one SRS resource according to the maximum among the numbers of antenna ports contained in all the SRS resources; and determines the bit width of the TPMI indication information corresponding to each of the remaining X−1 SRS resources according to the maximum among the numbers of antenna ports contained in all the SRS resources; or the base station determines the bit width of the TPMI and transmit layer indicator of the one SRS resource according to the number of antenna ports contained in the one SRS resource; and determines the bit width of the TPMI indication information corresponding to each of the remaining X−1 SRS resources according to the maximum among the numbers of antenna ports contained in all the SRS resources; or the base station determines the bit width of the TPMI and transmit layer indicator of the one SRS resource according to the maximum among the numbers of antenna ports contained in all the SRS resources; and determines the bit widths of the TPMI, each corresponding to the number of antenna ports of each of the X SRS resources, according to the number of antenna ports contained in the each of the X SRS resources, and takes the maximum value thereof as the bit width of the TPMI corresponding to each of the remaining X−1 SRS resources; or the base station determines the bit width of the TPMI and transmit layer indicator of the one SRS resource, according to the number of antenna ports contained in the one SRS resource; and determines the bit widths of the TPMI, each corresponding to the number of antenna ports of each of the X SRS resources, according to the number of antenna ports contained in the each of the X SRS resources, and takes the maximum value thereof as the bit width of the TPMI corresponding to each of the remaining X−1 SRS resources; or the base station determines the bit widths of the TPMI and the bit width of the transmit layer indicator, each corresponding to the number of antenna ports of the each of X SRS resources, according to the number of antenna ports contained in the each of the X SRS resources, takes the maximum among the bit widths of the transmit layer indicators as the bit width of the transmit layer indicator of the one SRS resource, and takes the maximum among the bit widths of the TPMI indication information as the bit width of the TPMI corresponding to each of the X SRS resources; or the base station determines the bit widths of the TPMI, each corresponding to the number of antenna ports of each of X SRS resources, as well as the jointly-encoded bit widths of the TPMI and transmit layer indicator, each corresponding to the number of antenna ports of each of X SRS resources, according to the number of antenna ports contained in the each of the X SRS resources, takes the maximum among the jointly-encoded bit widths of the TPMIs and transmit layer indicators as the bit width of the transmit layer indicator of the one SRS resource, and takes the maximum among the bit widths of the TPMI indication information as the bit width of the TPMI corresponding to each of the X SRS resources; or the base station determines the bit width of the TPMI and transmit layer indicator of the one SRS resource, according to the maximum among the numbers of antenna ports contained in all the SRS resources; and for each of the remaining X−1 SRS resources, determines the bit width of the TPMI corresponding to the SRS resource, according to the number of transmission streams and the number of antenna ports contained in the SRS resource; or the base station determines the bit width of the TPMI and transmit layer indicator of the one SRS resource, according to the number of antenna ports contained in the one SRS resource; and for each of the remaining X−1 SRS resources, determines the bit width of the TPMI corresponding to the SRS resource, according to the number of transmission streams and the number of antenna ports contained in the SRS resource; or the base station determines the bit width of the TPMI and transmit layer indicator of the one SRS resource, according to the maximum among the numbers of antenna ports contained in all the SRS resources; and for each of the remaining X−1 SRS resources, determines the bit widths of the TPMIs corresponding to other SRS resources, according to the number of transmission streams and the maximum among the numbers of antenna ports contained in all the SRS resources; or the base station determines the bit width of the TPMI and transmit layer indicator of the one SRS resource, according to the number of antenna ports contained in the one SRS resource; and for each of the remaining X−1 SRS resources, determines the bit widths of the TPMIs corresponding to other SRS resources, according to the number of transmission streams and the maximum among the numbers of antenna ports contained in all the SRS resources; or the base station determines the bit width of the TPMI and transmit layer indicator of the one SRS resource, according to the maximum among the numbers of antenna ports contained in all the SRS resources; and for each of the remaining X−1 SRS resources, determines the bit widths of the TPMI, each corresponding to the number of antenna ports of each of X SRS resources, according to the number of transmission streams and the number of antenna ports contained in the each of the X SRS resources, and takes the maximum value thereof as the bit width of the TPMI corresponding to the SRS resource; or the base station determines the bit width of the TPMI and transmit layer indicator of the one SRS resource, according to the number of antenna ports contained in the one SRS resource; and for each of the remaining X−1 SRS resources, determines the bit widths of the TPMI, each corresponding to the number of antenna ports of each of X SRS resources, according to the number of transmission streams and the number of antenna ports contained in the each of the X SRS resources, and takes the maximum value thereof as the bit width of the TPMI corresponding to the SRS resource; or the base station determines the bit widths of the transmit layer indicator and the bit widths of the TPMI during single-stream transmission, each corresponding to the number of antenna ports of each of X SRS resources, according to the number of antenna ports contained in the each of the X SRS resources, takes the maximum among all the determined bit widths of the transmit layer indicators as the bit width of the transmission stream number of the one SRS resource, and takes the maximum among all the determined bit widths of the TPMIs as the bit width of the TPMI corresponding to each of the remaining X−1 SRS resources; or the base station determines the bit widths of the TPMI during single-stream transmission, each corresponding to the number of antenna ports of each of X SRS resources, as well as the jointly-encoded bit widths of the TPMI and transmit layer indicator, each corresponding to the number of antenna ports of each of X SRS resources, according to the number of antenna ports contained in the each of the X SRS resources, takes the maximum among all the determined jointly-encoded bit widths of the TPMIs and transmit layer indicators as the bit width of the transmit layer indicator of the one SRS resource, and takes the maximum among the bit widths of the TPMIs during single-stream transmission as the bit width of the TPMI corresponding to each of the remaining X−1 SRS resources.

When the scheduling information of each of the X SRS resources corresponding to the X groups of uplink scheduling information is jointly encoded in the DCI, the step in which the base station determines the bit width of the X groups of uplink scheduling information in the DCI according to the number of antenna ports contained in SRS resources corresponding to the X groups of uplink scheduling information includes:

the base station determines the total bit width of the TPMIs and/or transmit layer indicators corresponding to all the SRS resources, according to the sum of possible values of the TPMI and the number of transmission streams under the number of SRS ports contained in one of the X SRS resources and possible values of the TPMIs under the numbers of SRS ports contained in the remaining X−1 SRS resources; or the base station determines the total bit width of the TPMIs and/or transmit layer indicators corresponding to all the SRS resources, according to the maximum among possible values of the TPMI and the number of transmission streams under the number of SRS ports contained in one of the X SRS resources and possible values of the TPMIs under the numbers of SRS ports contained in the remaining X−1 SRS resources; or the base station determines the total bit width of the TPMIs and/or transmit layer indicators corresponding to all the SRS resources, according to the possible values of the TPMI and the number of transmission streams under the number of SRS ports contained in one of the X SRS resources and the possible values of the TPMIs under the maximum among the numbers of SRS ports contained in the remaining X−1 SRS resources; or the base station determines the total bit width of the TPMIs and/or transmit layer indicators corresponding to all the SRS resources, according to the sum of possible values of the TPMI and the number of transmission streams under the number of SRS ports contained in one of the X SRS resources and possible values of the TPMIs under the numbers of SRS ports contained in the remaining X−1 SRS resources under the determined number of transmission streams; or the base station determines the total bit width of the TPMIs and/or transmit layer indicators corresponding to all the SRS resources, according to the maximum among possible values of the TPMI and the number of transmission streams under the number of SRS ports contained in one of the X SRS resources and possible values of the TPMIs under the numbers of SRS ports contained in the remaining X−1 SRS resources under the determined number of transmission streams; or the base station determines the total bit width of the TPMIs and/or transmit layer indicators corresponding to all the SRS resources, according to the possible values of the TPMI and the number of transmission streams under the number of SRS ports contained in one of the X SRS resources and the possible values of the TPMIs under the maximum among the numbers of SRS ports contained in the remaining X−1 SRS resources under the determined number of transmission streams; or the base station determines the total bit width of the TPMIs and/or transmit layer indicators corresponding to all the SRS resources, according to the possible values of the TPMI and the number of transmission streams under the number of SRS ports contained in one of the X SRS resources and the possible values of the TPMIs during single-stream transmission under the numbers of SRS ports contained in the remaining X−1 SRS resources; or the base station determines the total bit width of the TPMIs and/or transmit layer indicators corresponding to all the SRS resources, according to the maximum among the possible values of the TPMI and the number of transmission streams under the number of SRS ports contained in one of the X SRS resources and the possible values of the TPMIs during single-stream transmission under the numbers of SRS ports contained in the remaining X−1 SRS resources; or the base station determines the total bit width of the TPMIs and/or transmit layer indicators corresponding to all the SRS resources, according to the possible values of the TPMI and the number of transmission streams under the number of SRS ports contained in one of the X SRS resources and the possible values of the TPMIs during single-stream transmission under the maximum among the numbers of SRS ports contained in the remaining X−1 SRS resources.

Correspondingly, the UE determines the bit width of the TPMI and TRI in the same way, and decodes the TPMI and TRI in the corresponding decoding way to obtain the precoding matrix and the number of transmission streams corresponding to each antenna panel. According to the TPMI and TRI indicated by the uplink scheduling information as well as the SRS resources corresponding to the uplink scheduling information, the UE determines that the PUSCH corresponds to the precoding and the number of transmission streams of the data stream corresponding to the uplink scheduling information. The UE integrates all uplink scheduling indication information to determine the total precoding and transmission stream of the PUSCH, and then performs the PUSCH transmission.

It should be noted that the TPMI and TRI in the above uplink scheduling information including the TPMI and TRI can be independently encoded or jointly encoded, which is not specifically limited in the embodiments of the present disclosure.

Further, in the codebook-based transmission mode, the base station may also send the SRS resource indication information to the UE after receiving the SRSs sent by the UE based on the instruction, where the SRS resource indication information indicates SRS resources corresponding to each of the X groups of uplink scheduling information.

(2) In the non-codebook-based transmission mode, the X groups of uplink scheduling information include the SRI and/or transmit layer indicator corresponding to each group of SRS resources.

Specifically, X groups of SRS resources corresponding to the X groups of uplink scheduling information may belong to X SRS resource sets, and the X groups of uplink scheduling information and the X SRS resource sets have a one-to-one correspondence.

In this case, the base station may determine the bit width of the X groups of uplink scheduling information in the DCI, according to the number of SRS resources included in the SRS resource sets corresponding to the X groups of uplink scheduling information. The specific implementation may be: the base station determines the bit width of the $j^{th}$ one of the X groups of uplink scheduling information in the DCI, according to the number of SRS resources contained in an SRS resource set corresponding to the $j^{th}$ group of uplink scheduling information, where j is an integer greater than or equal to 1 and less than or equal to X.

In specific implementation processes, the X groups of uplink scheduling information can indicate the SRI and/or transmit layer indicator corresponding to each SRS resource set in different ways. The specific indication ways include but not limited to the following three ways.

In a first way: the scheduling information of each of the X SRS resource sets includes the SRI and/or transmit layer indicator of each SRS resource.

The scheduling information of each of the X SRS resource sets may be independently encoded in the DCI or may be jointly encoded in the DCI, which is not specifically limited in the embodiments of the present disclosure.

When the scheduling information of each of the X SRS resource sets is independently encoded in the DCI, the step in which the base station determines the bit width of the X groups of uplink scheduling information in the DCI includes: the base station determines the bit width of the SRI and transmit layer indicator corresponding to one SRS resource set, according to the number of SRS resources included in the SRS resource set; or the base station determines the bit width of the SRI and transmit layer indicator corresponding to each SRS resource set, according to the maximum number of SRS resources included in all the SRS resource sets; or the base station determines the bit widths of the SRI and transmit layer indicator, each corresponding to the number of SRS resources contained in each X SRS resource set, according to the numbers of SRS resources included in all of the X SRS resource sets, and takes the maximum value thereof as the bit width of the SRI and transmit layer indicator corresponding to each SRS resource set.

When the scheduling information of each of the X SRS resource sets is jointly encoded in the DCI, the step in which the base station determines the bit width of the X groups of uplink scheduling information in the DCI includes:

the base station determines the total bit width of the SRIs and transmit layer indicators corresponding to all the SRS resource sets, according to the numbers of SRS resources included in all the SRS resource sets; or the base station determines the total bit width of the SRIs and transmit layer indicators corresponding to all the SRS resource sets, according to the maximum among the numbers of SRS resources included in all the SRS resource sets; or the base station determines the bit widths of the SRIs and transmit layer indicators corresponding to all the numbers of SRS resources, according to the number of SRS resources included in each of the X SRS resource sets, and takes the maximum value thereof as the bit width of the SRI and transmit layer indicator corresponding to each SRS resource set. Correspondingly, the UE determines the bit width of the SRI and/or transmit layer indicator in the same way, and decodes in the corresponding decoding way to obtain the SRI and/or transmit layer indicator corresponding to each antenna panel.

In a second way: the scheduling information of each of the X SRS resource sets includes the SRI of each SRS resource.

The number of transmission streams of each antenna panel can be separately indicated by the base station to the UE. For example, in addition to X groups of scheduling information, the UL grant information may further include the independent transmission stream number indication information, which may be determined by the base station according to the SRSs sent by the UE, after the base station receives and measures the SRSs sent by the UE based on the instruction. This information may indicate that all SRS resource sets correspond to the same number of transmission streams.

In a specific implementation process, the scheduling information of each of the X SRS resource sets may be independently encoded in the DCI or may be jointly encoded in the DCI, which is not specifically limited in the embodiments of the present disclosure.

When the scheduling information of each of the X SRS resource sets is independently encoded in the DCI, the step in which the base station determines the bit width of the X groups of uplink scheduling information in the DCI includes: the base station determines the bit width of the SRI corresponding to one SRS resource set, according to the number of SRS resources included in the SRS resource set; or the base station determines the bit widths of the SRI, each corresponding to each SRS resource set, according to the maximum number of SRS resources included in all the SRS resource sets; or the base station determines the bit widths of the SRI, each corresponding to the number of SRS resources included in each of X SRS resource sets, according to the number of SRS resources included in the each of the X SRS resource sets, and takes the maximum value thereof as the bit width of the SRI corresponding to each SRS resource set.

When the scheduling information of each of the X SRS resource sets is jointly encoded in the DCI, the step in which the base station determines the bit width of the X groups of uplink scheduling information in the DCI includes:

the base station determines the total bit width of the SRIs corresponding to all the SRS resource sets, according to the sum of the possible values of the numbers of SRS resources included in all the SRS resource sets; or the base station determines the total bit width of the SRIs corresponding to all the SRS resource sets, according to the maximum among the possible values of the numbers of SRS resources included in all the SRS resource sets.

Correspondingly, the UE determines the bit width of the SRI in the same way, and decodes in the corresponding decoding way to obtain the SRI corresponding to each antenna panel.

In a third way: the scheduling information of one of the X SRS resource sets includes the SRI and transmit layer indicator of the one SRS resource set, and the scheduling information of each of the remaining X−1 SRS resource sets includes the SRI of the each SRS resource set; and the transmit layer indicator included in the scheduling information of the one SRS resource set indicates the number of transmission streams of each of the X SRS resource sets simultaneously.

In a specific implementation process, the scheduling information of each of the X SRS resource sets may be independently encoded in the DCI or may be jointly encoded in the DCI, which is not specifically limited in the embodiments of the present disclosure.

When the scheduling information of each of the X SRS resource sets is independently encoded in the DCI, the step in which the base station determines the bit width of the X groups of uplink scheduling information in the DCI includes:

the base station determines the bit width of the SRI and transmit layer indicator of the one SRS resource set, according to the maximum among the numbers of SRS resources contained in all the SRS resource sets; and for each of the remaining X−1 SRS resource sets, determines the bit width of the SRI corresponding to the SRS resource set, according to the number of SRS resources contained in the SRS resource set; or the base station determines the bit width of the SRI and transmit layer indicator of the one SRS resource set, according to the number of SRS resources contained in the one SRS resource set; and for each of the remaining X−1 SRS resource sets, determines the bit width of the SRI corresponding to the SRS resource set, according to the number of SRS resources contained in the SRS resource set; or the base station determines the bit width of the SRI and transmit layer indicator of the one SRS resource set, according to the maximum among the numbers of SRS resources contained in all the SRS resource sets; and for each of the remaining X−1 SRS resource sets, determines the bit width of the SRI corresponding to the SRS resource set, according to the maximum among the numbers of SRS resources contained in all the SRS resource sets; or the base station determines the bit width of the SRI and transmit layer indicator of the one SRS resource set, according to the number of SRS resources contained in the one SRS resource set; and for each of the remaining X−1 SRS resource sets, determines the bit width of the SRI corresponding to the SRS resource set, according to the maximum among the numbers of SRS resources contained in all the SRS resource sets; or the base station determines the bit width of the SRI and transmit layer indicator of the one SRS resource set, according to the maximum among the numbers of SRS resources contained in all the SRS resource sets; and for each of the remaining X−1 SRS resource sets, determines the bit width of the SRI corresponding to the SRS resource set, according to the number of SRS resources contained in the SRS resource set and the number of transmission streams; or the base station determines the bit width of the SRI and transmit layer indicator of the one SRS resource set according to the number of SRS resources contained in the one SRS resource set; and for each of the remaining X−1 SRS resource sets, determines the bit width of the SRI corresponding to the SRS resource set according to the number of SRS resources and the number of transmission streams contained in the SRS resource set; or the base station determines the bit width of the SRI and transmit layer indicator of the one SRS resource set, according to the maximum among the numbers of SRS resources contained in all the SRS resource sets; and for each of the remaining X−1 SRS resource sets, determines the bit width of the SRI corresponding to the SRS resource set according to the maximum among the numbers of SRS resources contained in all the SRS resource sets and the number of transmission streams; or the base station determines the bit width of the SRI and transmit layer indicator of the one SRS resource set, according to the number of SRS resources contained in the one SRS resource set; and for each of the remaining X−1 SRS resource sets, determines the bit width of the SRI corresponding to the SRS resource set according to the maximum among the numbers of SRS resources contained in all the SRS resource sets and the number of transmission streams; or the base station determines the bit width of the SRI and transmit layer indicator of the one SRS resource set, according to the maximum among the numbers of SRS resources contained in all the SRS resource sets; and for each of the remaining X−1 SRS resource sets, determines the bit widths of the SRI each corresponding to the number of SRS resources contained in each of X SRS resource sets, according to the number of SRS resources contained in each of the X SRS resource sets, and takes the maximum value thereof as the bit width of the SRI corresponding to each of the remaining X−1 SRS resource sets; or the base station determines the bit width of the SRI and transmit layer indicator of the one SRS resource set, according to the number of SRS resources contained in the one SRS resource set; and for each of the remaining X−1 SRS resource sets, determines the bit widths of the SRI, each corresponding to the number of SRS resources of each of X SRS resource sets, according to the number of SRS resources contained in each of the X SRS resource sets, and takes the maximum value thereof as the bit width of the SRI corresponding to each of the remaining X−1 SRS resource sets; or the base station determines the bit widths of the SRI and the bit widths of the transmit layer indicator, each corresponding to the number of SRS resources contained in each of the X SRS resource sets, according to the number of SRS resources contained in each of the X SRS resource sets, takes the maximum among all the determined bit widths of the transmit layer indicators as the bit width of the transmit layer indicator of the one SRS resource set, and takes the maximum among all the determined bit widths of the SRIs as the bit width of the SRI corresponding to each of the X SRS resource sets; or the base station determines the bit widths of the SRI, each corresponding to the number of SRS resources contained in each of the X SRS resource sets, as well as the jointly-encoded bit widths of the SRI and transmit layer indicator, each corresponding to the number of SRS resources contained in each of the X SRS resource sets, according to the number of SRS resources contained in each of the X SRS resource sets, takes the maximum among all the determined jointly-encoded bit widths of the SRIs and transmit layer indicators as the bit width of the transmit layer indicator of the one SRS resource set, and takes the maximum among all the determined bit widths of the SRIs as the bit width of the SRI corresponding to each of the remaining X−1 SRS resource sets.

When the scheduling information of each of the X SRS resource sets is jointly encoded in the DCI, the step in which the base station determines the bit width of the X groups of uplink scheduling information in the DCI includes:

the base station determines the total bit width of the SRIs and/or transmit layer indicators corresponding to all the SRS resources, according to the sum of the number of SRS resources and the number of transmission streams included in one of the X SRS resource sets, and the possible values of the numbers of SRS ports included in the remaining X−1 SRS resource sets; or the base station determines the total bit width of the SRIs and/or transmit layer indicators corresponding to all the SRS resources, according to the maximum value among the number of SRS resources and the number of transmission streams included in one of the X SRS resource sets, and the numbers of resources included in the remaining X−1 SRS resource sets.

Correspondingly, the UE determines the bit width of the SRI and/or transmit layer indicator in the same way, and decodes in the corresponding decoding way to obtain the SRI and/or transmit layer indicator corresponding to each antenna panel.

In this embodiment, multiple encoding implementations of uplink scheduling information are proposed. For example, in the codebook-based transmission mode, the bit width of the X groups of uplink scheduling information in the DCI can be determined according to the number of antenna ports included in the SRS resources, while in the non-codebook-based transmission mode, the bit width of the X groups of uplink scheduling information in the DCI can be determined according to the number of SRS resources contained in the SRS resource sets. This embodiment further increases the flexibility of uplink scheduling and improves the performance of uplink transmission of the UE.

Embodiments of the disclosure are applicable to the 5G NR system, and may also be applicable to other wireless communication systems, e.g., LTE system, evolution system of NR system, 6G system, etc., which are not limited in the embodiments of the present disclosure. For example, in the subsequent evolution versions of LTE, various embodiments in the above (1) may be used in the transmission mode TM9 or transmission mode TM10; for another example, in the subsequent versions of NR system, if the transmission mode of transmit diversity is introduced, then various embodiments in the above (2) may also be used.

Figure 6:
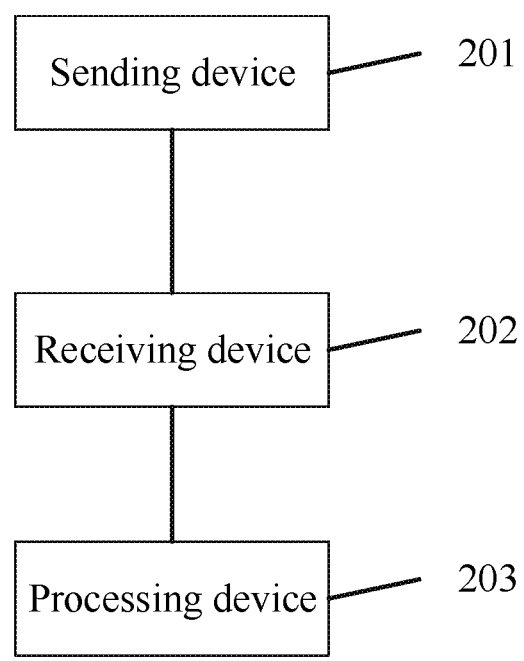
FIG. 6 is a structural schematic diagram of an uplink transmission apparatus in an embodiment of the present disclosure.

One embodiment of the present disclosure further provides an uplink transmission apparatus, referring to FIG. 6, including:

a sending device 201 configured to instruct a UE to send SRSs corresponding to N groups of SRS resources, where each group of SRS resources includes one or more SRS resources, and N is a positive integer greater than 1;

a receiving device 202 configured to receive the SRSs sent by the UE;

a processing device 203 configured to determine X groups of uplink scheduling information; where each group of uplink scheduling information corresponds to one of the N groups of SRS resources, different groups of uplink scheduling information correspond to different groups of SRS resources, and X is a positive integer greater than 1 and less than N, or X is a positive integer greater than 1 and equal to N;

the sending device 201 being further configured to send the X groups of uplink scheduling information to the UE for the UE performing uplink signal transmission according to the X groups of uplink scheduling information.

In one embodiment, one of the X groups of uplink scheduling information corresponds to one antenna panel of the UE.

In one embodiment, the SRSs are sent by the UE using a plurality of antenna panels, where the SRSs are sent by the UE, using different groups of antenna panels, on different groups of SRS resources.

In one embodiment, the sending device 201 is further configured to:

send the correspondence information between the X groups of uplink scheduling information and the N groups of SRS resources to the UE after instructing the UE to send the SRSs corresponding to the N groups of SRS resources.

In one embodiment, a signaling carrying the uplink scheduling information does not contain an SRS Resource Indicator (SRI) indicating an SRS resource corresponding to uplink scheduling information.

In one embodiment, at least one of the X groups of uplink scheduling information contains indication information indicating that the at least one group of uplink scheduling information is not used for the uplink signal transmission.

In one embodiment, the device is further configured to:
agree on the value of X with the UE before determining the X groups of uplink scheduling information.

In one embodiment, the sending device 201 is further configured to:

send the resource set indication information to the UE after the receiving device 202 receives the SRSs sent by the UE, where the SRS resource set indication information indicates SRS resource sets corresponding to the X groups of uplink scheduling information.

In one embodiment, the X groups of uplink scheduling information include one or more relative relationships among some of the X groups of uplink scheduling information, or include one or more relative relationships among all of the X groups of uplink scheduling information; and a relative relationship comprises phase rotation and/or amplitude scaling.

In one embodiment, each group of uplink scheduling information includes a Transmit Precoding Matrix Indicator (TPMI), of an SRS resource corresponding to the each group of uplink scheduling information, and/or a transmit layer indicator, of an SRS resource corresponding to the each group of uplink scheduling information.

In one embodiment, different groups of uplink scheduling information indicate an equal number of transmission streams.

In one embodiment, the sending device 201 is further configured to:

send the SRS resource indication information to the UE after the receiving device 202 receives the SRSs sent by the UE, where the SRS resource indication information indicates one or more SRS resources corresponding to each group of uplink scheduling information.

In one embodiment, the sending device 201 is configured to:
    determine the bit width of the X groups of uplink scheduling information in DCI according to the number of antenna ports contained in SRS resources corresponding to the X groups of uplink scheduling information, generate the DCI, and send the X groups of uplink scheduling information to the UE through the DCI.

In one embodiment, the sending device 201 is configured to:
    determining, by the base station, a bit width of a $k^{th}$ one of the X groups of uplink scheduling information in the DCI, according to a quantity of antenna ports of SRS resources in the group of SRS resources corresponding to the $k^{th}$ group of uplink scheduling information, where k is an integer greater than or equal to 1 and less than or equal to X.

In one embodiment, the X groups of uplink scheduling information are contained in X SRS resource sets of the N groups of SRS resources, and each group of the X groups of uplink scheduling information is contained in each SRS resource set.

In one embodiment, each of the X groups of uplink scheduling information includes an SRS Resource Indicator (SRI) of an SRS resource in an SRS resource set corresponding to the each group of uplink scheduling information, and/or a transmit layer indicator of an SRS resource in an SRS resource set corresponding to the each group of uplink scheduling information.

In one embodiment, the sending device 201 is configured to:
    determine the bit width of the X groups of uplink scheduling information in DCI according to the number of SRS resources contained in SRS resource sets corresponding to the X groups of uplink scheduling information, generate the DCI, and send the X groups of uplink scheduling information to the UE through the DCI.

In one embodiment, the sending device 201 is configured to:
    determine a bit width of a $j^{th}$ one of the X groups of uplink scheduling information in the DCI, according to a quantity of SRS resources in an SRS resource set corresponding to the $j^{th}$ group of uplink scheduling information, and j is an integer greater than or equal to 1 and less than or equal to X.

For the specific implementations of the operations performed by the above devices, the reference may be made to the specific implementations of the corresponding steps performed by the base station in the above uplink transmission method of the embodiments of the present disclosure, which will not be repeated in the embodiment of the disclosure.

Figure 7:
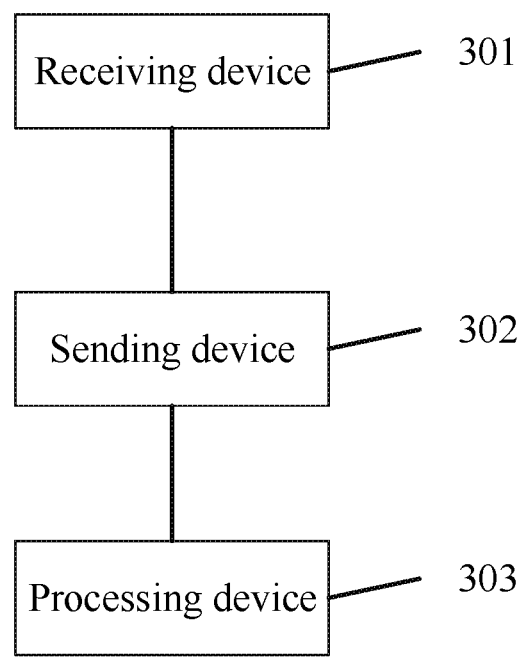
FIG. 7 is a structural schematic diagram of another uplink transmission apparatus in an embodiment of the present disclosure.

One embodiment of the present disclosure further provides an uplink transmission apparatus, referring to FIG. 7, including:
    a receiving device 301 configured to receive a message sent by a base station for instructing the apparatus to send SRSs corresponding to N groups of SRS resources, where each group of SRS resources includes one or more SRS resources, and N is a positive integer greater than 1;
    a sending device 302 configured to send the SRSs corresponding to the N groups of SRS resources;
    the receiving device 301 being further configured to: receive X groups of uplink scheduling information sent by the base station;
    a processing device 303 configured to perform uplink signal transmission according to the X groups of uplink scheduling information; where each group of uplink scheduling information corresponds to one of the N groups of SRS resources, different groups of uplink scheduling information correspond to different groups of SRS resources, and X is a positive integer greater than 1 and not greater than N.

In one embodiment, one of the X groups of uplink scheduling information corresponds to one antenna panel of the apparatus.

In one embodiment, the sending device 302 is configured to:
    send the SRSs corresponding to the N groups of SRS resources by using a plurality of antenna panels, and the sending device 302 uses different groups of antenna panels to send SRSs on different groups of SRS resources.

In one embodiment, the receiving device 301 is further configured to:
    receive the correspondence information between the X groups of uplink scheduling information and the N groups of SRS resources sent by the base station after receiving the message sent by the base station for instructing the apparatus to send the SRSs corresponding to the N groups of SRS resources.

In one embodiment, a signaling carrying the uplink scheduling information does not contain an SRS Resource Indicator (SRI) indicating an SRS resource corresponding to X groups of the uplink scheduling information.

In one embodiment, at least one of the X groups of uplink scheduling information contains indication information indicating that the at least one group of uplink scheduling information is not used for the uplink signal transmission.

In one embodiment, the processing device 303 is further configured to:
    agree on the value of X with the base station before the receiving device 301 receives the X groups of uplink scheduling information sent by the base station.

In one embodiment, the receiving device 301 is further configured to:
    receive the SRS resource set indication information sent by the base station after the sending device 302 sends the SRSs corresponding to the N groups of SRS resources, where the SRS resource set indication information indicates SRS resource sets corresponding to the X groups of uplink scheduling information.

In one embodiment, the X groups of uplink scheduling information include one or more relative relationships among some of the X groups of uplink scheduling information, or include one or more relative relationships among all of the X groups of uplink scheduling information; where a relative relationship comprises phase rotation and/or amplitude scaling.

In one embodiment, each group of uplink scheduling information includes a Transmit Precoding Matrix Indicator (TPMI), of an SRS resource corresponding to the each group of uplink scheduling information, and/or a transmit layer indicator, of an SRS resource corresponding to the each group of uplink scheduling information.

In one embodiment, different groups of uplink scheduling information indicate an equal number of transmission streams.

In one embodiment, the receiving device 301 is further configured to:
    receive the SRS resource indication information sent by the base station after the sending device 302 sends the SRSs corresponding to the N groups of SRS resources, where the SRS resource indication information indicates one or more SRS resources corresponding to each group of uplink scheduling information.

In one embodiment, the receiving device 301 is further configured to:
receive X groups of uplink scheduling information sent by the base station, which includes:
receive the DCI sent by the base station, and obtain the X groups of uplink scheduling information from the DCI;
the processing device 303 is configured to: determine the bit width of the X groups of uplink scheduling information in the DCI according to the number of antenna ports contained in SRS resources corresponding to the X groups of uplink scheduling information; and decode the DCI according to the bit width of the X groups of uplink scheduling information in the DCI to obtain the X groups of uplink scheduling information.

In one embodiment, the processing device 303 is configured to:
determine a bit width of a $k^{th}$ one of the X groups of uplink scheduling information in the DCI, according to a quantity of antenna ports of SRS resources in the group of SRS resources corresponding to the $k^{th}$ group of uplink scheduling information, and k is an integer greater than or equal to 1 and less than or equal to X.

In one embodiment, the X groups of uplink scheduling information are contained in X SRS resource sets of the N groups of SRS resources, and each group of the X groups of uplink scheduling information is contained in each SRS resource set.

In one embodiment, each group of uplink scheduling information includes: an SRS Resource Indicator (SRI) of an SRS resource in an SRS resource set corresponding to the each group of uplink scheduling information, and/or a transmit layer indicator of an SRS resource in an SRS resource set corresponding to the each group of uplink scheduling information.

In one embodiment, the receiving device 301 is further configured to:
receive X groups of uplink scheduling information sent by the base station, which specifically includes:
receive the DCI sent by the base station, and obtain the X groups of uplink scheduling information from the DCI;
the processing device 303 is configured to: determine the bit width of the X groups of uplink scheduling information in the DCI according to the number of SRS resources contained in SRS resource sets corresponding to the X groups of uplink scheduling information; and decode the DCI according to the bit width of the X groups of uplink scheduling information in the DCI to obtain the X groups of uplink scheduling information.

In one embodiment, the processing device 303 is configured to:
determine the bit width of the $j^{th}$ one of the X groups of uplink scheduling information in DCI according to the number of SRS resources in an SRS resource set corresponding to the $j^{th}$ group of uplink scheduling information, where j is an integer greater than or equal to 1 and less than or equal to X.

For the specific implementations of the operations performed by the above devices, the reference may be made to the specific implementations of the corresponding steps performed by the UE in the above uplink transmission method of the embodiments of the present disclosure, which will not be repeated in the embodiment of the disclosure.

Figure 8:
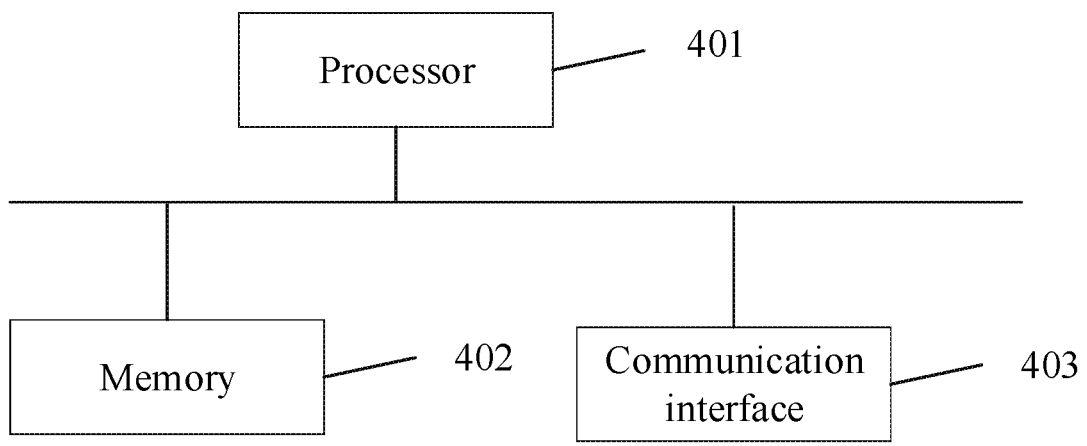
FIG. 8 is a structural schematic diagram of an uplink transmission device in an embodiment of the present disclosure.

One embodiment of the present disclosure further provides an uplink transmission device. Referring to FIG. 8, it includes:
at least one processor 401, and
a memory 402 and a communication interface 403 communicatively connected to the at least one processor 401;
and the memory 402 stores instructions that can be executed by the at least one processor 401, and the at least one processor 401 performs any one of the above methods of the embodiments of the present disclosure via the communication interface 403 by executing the instructions stored in the memory 402.

One embodiment of the present disclosure further provides a computer readable storage medium storing the computer instructions, which cause a computer to perform the above methods of the embodiments of the present disclosure when running on the computer.

Embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An uplink transmission method, comprising: instructing, by a base station, a User Equipment (UE) to send Sounding Reference Signals (SRSs) corresponding to N groups of SRS resources, wherein each group of SRS resources comprises one or more SRS resources, and N is a positive integer greater than 1; receiving, by the base station, the SRSs sent by the UE;

determining, by the base station, X groups of uplink scheduling information; wherein each group of uplink scheduling information corresponds to one of the N groups of SRS resources, and X is a positive integer greater than 1 and less than N, or X is a positive integer greater than 1 and equal to N;

sending, by the base station, the X groups of uplink scheduling information to the UE for the UE performing uplink signal transmission according to the X groups of uplink scheduling information; and sending, by the base station, SRS resource set indication information to the UE, wherein the SRS resource set indication information indicates SRS resource sets corresponding to the X groups of uplink scheduling information.

2. The method of claim 1, wherein:

one of the X groups of uplink scheduling information corresponds to one antenna panel of the UE; and/or the SRSs are sent by the UE using a plurality of antenna panels, wherein the SRSs are sent by the UE, using different groups of antenna panels, on different groups of SRS resources;

and/or the X groups of uplink scheduling information comprise one or more relative relationships among some of the X groups of uplink scheduling information, or comprise one or more relative relationships among all of the X groups of uplink scheduling information; wherein a relative relationship comprises phase rotation and/or amplitude scaling; and/or the X groups of uplink scheduling information are contained in X SRS resource sets of the N groups of SRS resources, wherein each group of the X groups of uplink scheduling information is contained in each SRS resource set.

3. The method of claim 2, wherein:

each group of uplink scheduling information comprises: an SRS Resource Indicator (SRI) of an SRS resource in an SRS resource set corresponding to the each group of uplink scheduling information, and/or each group of uplink scheduling information comprises: a transmit layer indicator of an SRS resource in an SRS resource set corresponding to the each group of uplink scheduling information; and/or wherein the sending, by the base station, the X groups of uplink scheduling information to the UE, comprises: determining, by the base station, a bit width of the X groups of uplink scheduling information in Downlink Control Information (DCI), according to a quantity of SRS resources contained in SRS resource sets corresponding to the X groups of uplink scheduling information, generating the DCI, and sending, by the base station, the X groups of uplink scheduling information to the UE through the DCI.

4. The method of claim 1, further comprising:

sending, by the base station, correspondence information between the X groups of uplink scheduling information and the N groups of SRS resources to the UE.

5. The method of claim 1, wherein:

the X groups of uplink scheduling information is carried in a signaling, and the signaling does not contain an SRS Resource Indicator (SRI) indicating an SRS resource corresponding to uplink scheduling information; and/or each group of uplink scheduling information comprises: a Transmit Precoding Matrix Indicator (TPMI), of an SRS resource corresponding to the each group of uplink scheduling information; and/or each group of uplink scheduling information comprises: a transmit layer indicator, of an SRS resource corresponding to the each group of uplink scheduling information.

6. The method of claim 5, wherein one or a combination of following schemes is performed:

scheme I: each group of uplink scheduling information comprises: a Transmit Precoding Matrix Indicator (TPMI), of an SRS resource corresponding to the each group of uplink scheduling information, and different groups of uplink scheduling information indicate an equal number of transmission streams;

scheme II: each group of uplink scheduling information comprises: a transmit layer indicator, of an SRS resource corresponding to the each group of uplink scheduling information, and different groups of uplink scheduling information indicate an equal number of transmission streams;

scheme III: each group of uplink scheduling information comprises: a Transmit Precoding Matrix Indicator (TPMI), of an SRS resource corresponding to the each group of uplink scheduling information, and after the base station receives the SRSs sent by the UE, the method further comprises:

sending, by the base station, SRS resource indication information to the UE, wherein the SRS resource indication information indicates one or more SRS resources corresponding to each group of uplink scheduling information;

scheme IV: each group of uplink scheduling information comprises: a transmit layer indicator, of an SRS resource corresponding to the each group of uplink scheduling information, and after the base station receives the SRSs sent by the UE, the method further comprises:

sending, by the base station, SRS resource indication information to the UE, wherein the SRS resource indication information indicates one or more SRS resources corresponding to each group of uplink scheduling information;

scheme V: each group of uplink scheduling information comprises: a Transmit Precoding Matrix Indicator (TPMI), of an SRS resource corresponding to the each group of uplink scheduling information, and the sending, by the base station, the X groups of uplink scheduling information to the UE, comprises:

determining, by the base station, a bit width of the X groups of uplink scheduling information in Downlink Control Information (DCI), according to a quantity of antenna ports contained in SRS resources corresponding to the X groups of uplink scheduling information, generating, by the base station, the DCI, and sending, by the base station, the X groups of uplink scheduling information to the UE through the DCI;

scheme VI: each group of uplink scheduling information comprises: a transmit layer indicator, of an SRS resource corresponding to the each group of uplink scheduling information, and the sending, by the base station, the X groups of uplink scheduling information to the UE, comprises:

determining, by the base station, a bit width of the X groups of uplink scheduling information in Downlink Control Information (DCI), according to a quantity of antenna ports contained in SRS resources corresponding to the X groups of uplink scheduling information, generating, by the base station, the DCI, and sending, by the base station, the X groups of uplink scheduling information to the UE through the DCI.

7. The method of claim 5, wherein the X groups of uplink scheduling information indicates the TPMI and/or the transmit layer indicator corresponding to each group of SRS resources by:

different groups of uplink scheduling information in the X groups of uplink scheduling information corresponding to different SRS resources, and scheduling information for each of X SRS resources containing a TPMI and transmit layer indicator of the each of the X SRS resources; or different groups of uplink scheduling information in the X groups of uplink scheduling information corresponding to different SRS resources, and scheduling information for each of X SRS resources containing a TPMI of the each of the X SRS resources; or different groups of uplink scheduling information in the X groups of uplink scheduling information corresponding to different SRS resources, and scheduling information for one of X SRS resources, containing a TPMI and transmit layer indicator of the one SRS resource, and scheduling information for each of remaining X-1 SRS resources containing a TPMI of the each of remaining X-1 SRS resources; wherein the transmit layer indicator contained in the scheduling information for the one SRS resource indicates a quantity of transmission streams of each of the X SRS resources.

8. The method of claim 1, wherein at least one of the X groups of uplink scheduling information contains indication information indicating that the at least one group of uplink scheduling information is not used for the uplink signal transmission.

9. An uplink transmission method, comprising:

receiving, by a UE, a message sent by a base station for instructing the UE to send Sounding Reference Signals (SRSs) corresponding to N groups of SRS resources, wherein each group of SRS resources comprises one or more SRS resources, and N is a positive integer greater than 1;

sending, by the UE, the SRSs;

receiving, by the UE, X groups of uplink scheduling information sent by the base station;

wherein each group of uplink scheduling information corresponds to one of the N groups of SRS resources, X is a positive integer greater than 1 and less than N, or X is a positive integer greater than 1 and equal to N;

receiving, by the UE, SRS resource set indication information sent by the base station, wherein the SRS resource set indication information indicates SRS resource sets corresponding to the X groups of uplink scheduling information; and performing, by the UE, uplink signal transmission according to the X groups of uplink scheduling information.

10. The method of claim 9, wherein:

one of the X groups of uplink scheduling information corresponds to one antenna panel of the UE; and/or sending, by the UE, the SRSs corresponding to the N groups of SRS resources by using a plurality of antenna panels, wherein the UE uses different groups of antenna panels to send the SRSs on different groups of SRS resources; and/or the X groups of uplink scheduling information comprise one or more relative relationships among some of the X groups of uplink scheduling information, or comprise one or more relative relationships among all of the X groups of uplink scheduling information; wherein a relative relationship comprises phase rotation and/or amplitude scaling; and/or the X groups of uplink scheduling information are contained in X SRS resource sets of the N groups of SRS resources, wherein each group of the X groups of uplink scheduling information is contained in each SRS resource set.

11. The method of claim 10, wherein:

each group of uplink scheduling information comprises: an SRS Resource Indicator (SRI) of an SRS resource in an SRS resource set corresponding to the each group of uplink scheduling information, and/or each group of uplink scheduling information comprises: a transmit layer indicator of an SRS resource in an SRS resource set corresponding to the each group of uplink scheduling information; and/or the receiving, by the UE, the X groups of uplink scheduling information sent by the base station, comprises: receiving, by the UE, DCI sent by the base station, and obtaining the X groups of uplink scheduling information from the DCI; and the receiving, by the UE, DCI sent by the base station, and obtaining the X groups of uplink scheduling information from the DCI, comprises: determining, by the UE, a bit width of the X groups of uplink scheduling information in the DCI according to a quantity of SRS resources contained in SRS resource sets corresponding to the X groups of uplink scheduling information; and decoding, by the UE, the DCI according to the bit width of the X groups of uplink scheduling information in the DCI to obtain the X groups of uplink scheduling information.

12. The method of claim 9, further comprising:

receiving, by the UE, correspondence information sent by the base station, between the X groups of uplink scheduling information and the N groups of SRS resources.

13. The method of claim 9, wherein:

the X groups of uplink scheduling information is carried in a signaling, and the signaling does not contain an SRS Resource Indicator (SRI) indicating an SRS resource corresponding to X groups of the uplink scheduling information; and/or each group of uplink scheduling information comprises: a Transmit Precoding Matrix Indicator (TPMI), of an SRS resource corresponding to the each group of uplink scheduling information; and/or each group of uplink scheduling information comprises: a transmit layer indicator, of an SRS resource corresponding to the each group of uplink scheduling information.

14. The method of claim 13, wherein one or a combination of following schemes is performed:

scheme I: each group of uplink scheduling information comprises: a Transmit Precoding Matrix Indicator (TPMI), of an SRS resource corresponding to the each group of uplink scheduling information, and different groups of uplink scheduling information indicate an equal number of transmission streams;

scheme II: each group of uplink scheduling information comprises: a transmit layer indicator, of an SRS resource corresponding to the each group of uplink scheduling information, and different groups of uplink scheduling information indicate an equal number of transmission streams;

scheme III: each group of uplink scheduling information comprises: a Transmit Precoding Matrix Indicator (TPMI), of an SRS resource corresponding to the each group of uplink scheduling information, and
after the UE sends the SRSs corresponding to the N groups of SRS resources, the method further comprises:
receiving, by the UE, SRS resource indication information sent by the base station, wherein the SRS resource indication information indicates one or more SRS resources corresponding to each group of uplink scheduling information;
scheme IV: each group of uplink scheduling information comprises: a transmit layer indicator, of an SRS resource corresponding to the each group of uplink scheduling information, and
after the UE sends the SRSs corresponding to the N groups of SRS resources, the method further comprises:
receiving, by the UE, SRS resource indication information sent by the base station,
wherein the SRS resource indication information indicates one or more SRS resources corresponding to each group of uplink scheduling information;
scheme V: each group of uplink scheduling information comprises: a Transmit Precoding Matrix Indicator (TPMI), of an SRS resource corresponding to the each group of uplink scheduling information, and
the receiving, by the UE, the X groups of uplink scheduling information sent by the base station, comprises:
receiving, by the UE, Downlink Control Information (DCI) sent by the base station, and obtaining the X groups of uplink scheduling information from the DCI; and
the receiving, by the UE, the DCI sent by the base station, and obtaining the X groups of uplink scheduling information from the DCI, comprises:
determining, by the UE, a bit width of the X groups of uplink scheduling information in the DCI according to a quantity of antenna ports contained in SRS resources corresponding to the X groups of uplink scheduling information; and
decoding, by the UE, the DCI according to the bit width of the X groups of uplink scheduling information in the DCI to obtain the X groups of uplink scheduling information;
scheme VI: each group of uplink scheduling information comprises: a transmit layer indicator, of an SRS resource corresponding to the each group of uplink scheduling information, and
the receiving, by the UE, the X groups of uplink scheduling information sent by the base station, comprises:
receiving, by the UE, Downlink Control Information (DCI) sent by the base station, and obtaining the X groups of uplink scheduling information from the DCI; and
the receiving, by the UE, the DCI sent by the base station, and obtaining the X groups of uplink scheduling information from the DCI, comprises:
determining, by the UE, a bit width of the X groups of uplink scheduling information in the DCI according to a quantity of antenna ports contained in SRS resources corresponding to the X groups of uplink scheduling information; and
decoding, by the UE, the DCI according to the bit width of the X groups of uplink scheduling information in the DCI to obtain the X groups of uplink scheduling information.

15. The method of claim 13, wherein the X groups of uplink scheduling information indicates the TPMI and/or the transmit layer indicator corresponding to each group of SRS resources by:
different groups of uplink scheduling information in the X groups of uplink scheduling information corresponding to different SRS resources, and scheduling information for each of X SRS resources containing a TPMI and transmit layer indicator of the each of the X SRS resources; or
different groups of uplink scheduling information in the X groups of uplink scheduling information corresponding to different SRS resources, and scheduling information for each of X SRS resources containing a TPMI of the each of the X SRS resources; or
different groups of uplink scheduling information in the X groups of uplink scheduling information corresponding to different SRS resources, and scheduling information for one of X SRS resources, containing a TPMI and transmit layer indicator of the one SRS resource, and scheduling information for each of remaining X-1 SRS resources containing a TPMI of the each of remaining X-1 SRS resources; wherein the transmit layer indicator contained in the scheduling information for the one SRS resource indicates a quantity of transmission streams of each of the X SRS resources.

16. The method of claim 9, wherein at least one of the X groups of uplink scheduling information contains indication information indicating that the at least one group of uplink scheduling information is not used for the uplink signal transmission.

17. An uplink transmission device, comprising:
at least one processor, and
a memory and a communication interface communicatively connected to the at least one processor;
wherein the memory stores instructions executed by the at least one processor, and the at least one processor performs the method of claim 1 via the communication interface by executing the instructions stored in the memory.

18. An uplink transmission device, comprising:
at least one processor, and
a memory and a communication interface communicatively connected to the at least one processor;
wherein the memory stores instructions executed by the at least one processor, and the at least one processor performs the method of;
receiving a message sent by a base station for instructing the uplink transmission device to send Sounding Reference Signals (SRSs) corresponding to N groups of SRS resources,
wherein each group of SRS resources comprises one or more SRS resources, and N is a positive integer greater than 1;
sending the SRSs;
receiving X groups of uplink scheduling information sent by the base station;
wherein each group of uplink scheduling information corresponds to one of the N groups of SRS resources, and N is a positive integer greater than 1;
X is a positive integer greater than 1 and less than N, or X is a positive integer greater than 1 and equal to N;

receiving SRS resource set indication information sent by the base station, wherein the SRS resource set indication information indicates SRS resource sets corresponding to the X groups of uplink scheduling information; and performing uplink signal transmission according to the X groups of uplink scheduling information.

* * * * *